(12) United States Patent
Tonar et al.

(10) Patent No.: US 7,511,872 B2
(45) Date of Patent: Mar. 31, 2009

(54) ELECTROCHROMIC DEVICE

(75) Inventors: William L. Tonar, Holland, MI (US); David J. Cammenga, Zeeland, MI (US); David L. Poll, Holland, MI (US); Kevin B. Kar, Grand Haven, MI (US); Bradley L. Busscher, Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 12/014,447

(22) Filed: Jan. 15, 2008

(65) Prior Publication Data

US 2008/0151350 A1 Jun. 26, 2008

Related U.S. Application Data

(60) Division of application No. 10/850,697, filed on May 21, 2004, now Pat. No. 7,349,143, which is a continuation of application No. 10/260,741, filed on Sep. 30, 2002, now Pat. No. 7,064,882.

(51) Int. Cl.
*G02F 1/15* (2006.01)
*G02F 1/153* (2006.01)

(52) U.S. Cl. ...................... 359/267; 359/265
(58) Field of Classification Search .......... 359/265–275
See application file for complete search history.

(56) References Cited

U.S. PATENT DOCUMENTS

| | | | |
|---|---|---|---|
| 3,280,701 A | 10/1966 | Donnelly et al. | |
| 4,902,108 A | 2/1990 | Byker | |
| 5,066,112 A | 11/1991 | Lynam et al. | |
| 5,069,535 A | 12/1991 | Baucke et al. | |
| 5,073,012 A | 12/1991 | Lynam | |
| 5,076,673 A | 12/1991 | Lynam et al. | |
| 5,115,346 A | 5/1992 | Lynam | |
| 5,253,109 A | 10/1993 | O'Farrell et al. | |
| 5,379,146 A | 1/1995 | Defendini | |
| 5,640,274 A | 6/1997 | Iwama et al. | |
| 5,668,663 A | 9/1997 | Varaprasad et al. | |
| 5,724,187 A | 3/1998 | Varaprasad et al. | |
| 5,790,298 A | 8/1998 | Tonar | |
| 5,818,625 A | 10/1998 | Forgette et al. | |
| 6,064,508 A | 5/2000 | Forgette et al. | |
| 6,102,546 A | 8/2000 | Carter | |
| 6,280,041 B1 | 8/2001 | Unger et al. | |
| 6,317,248 B1 | 11/2001 | Agrawal et al. | |
| 6,350,843 B1 | 2/2002 | Fa | |
| 6,407,847 B1 | 6/2002 | Poll et al. | |

*Primary Examiner*—William C Choi
*Assistant Examiner*—Jack Dinh
(74) *Attorney, Agent, or Firm*—Bromberg & Sunstein LLP

(57) ABSTRACT

An electrochromic device that may have an elastomeric seal is disclosed as is an electrochromic device having a seal provided on the peripheral edges of both the front and rear elements and wherein the seal may comprises a first material having an oxygen permeability of less than about 2.0 cm$^3$·mm/m$^2$·day·atm. In addition, an electrochromic device may include a seal comprising a thin member bonded to the peripheral edge of at least one of the front and rear elements, wherein the thin member comprises one of a film, thin glass, and a strip of foil.

37 Claims, 24 Drawing Sheets

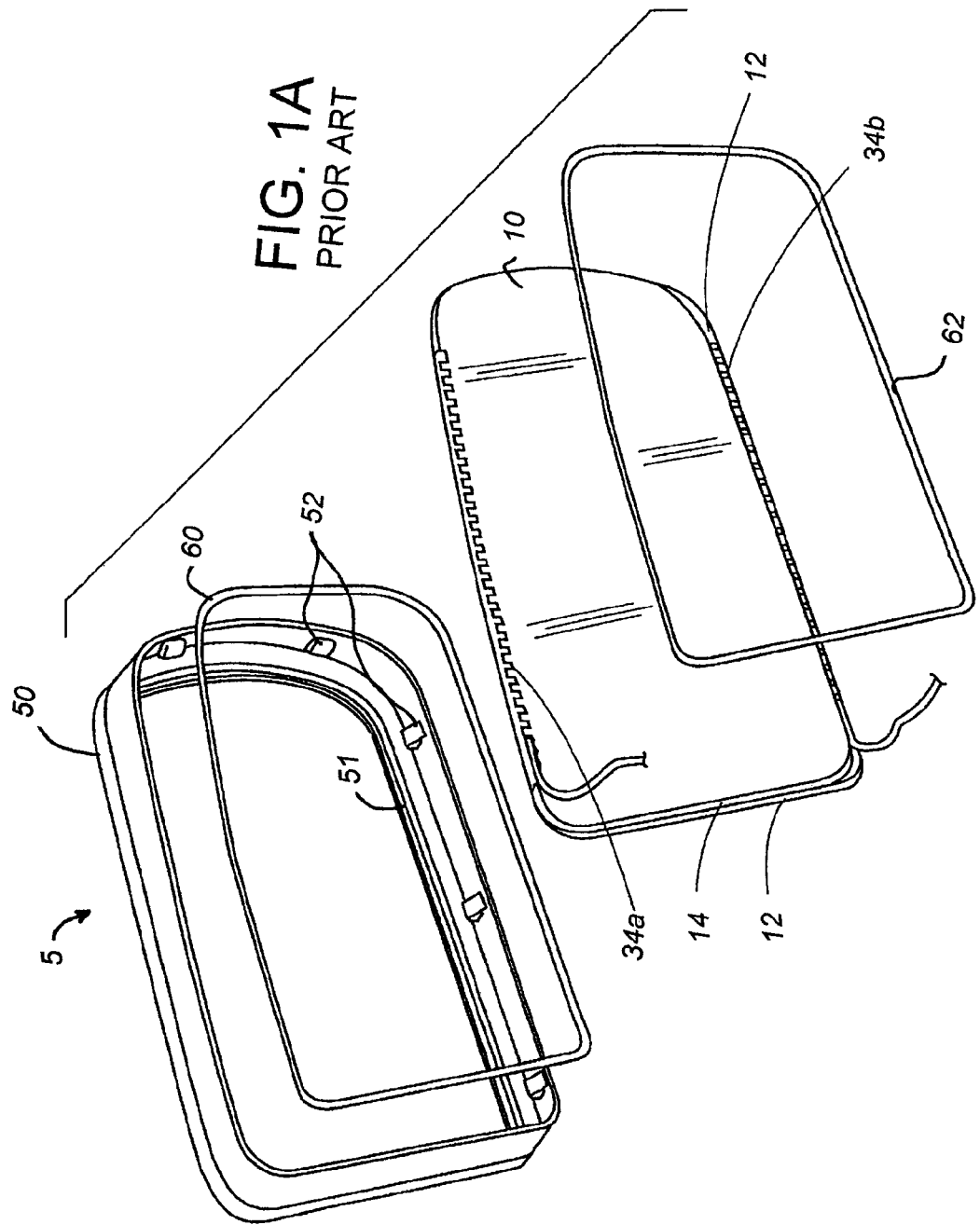

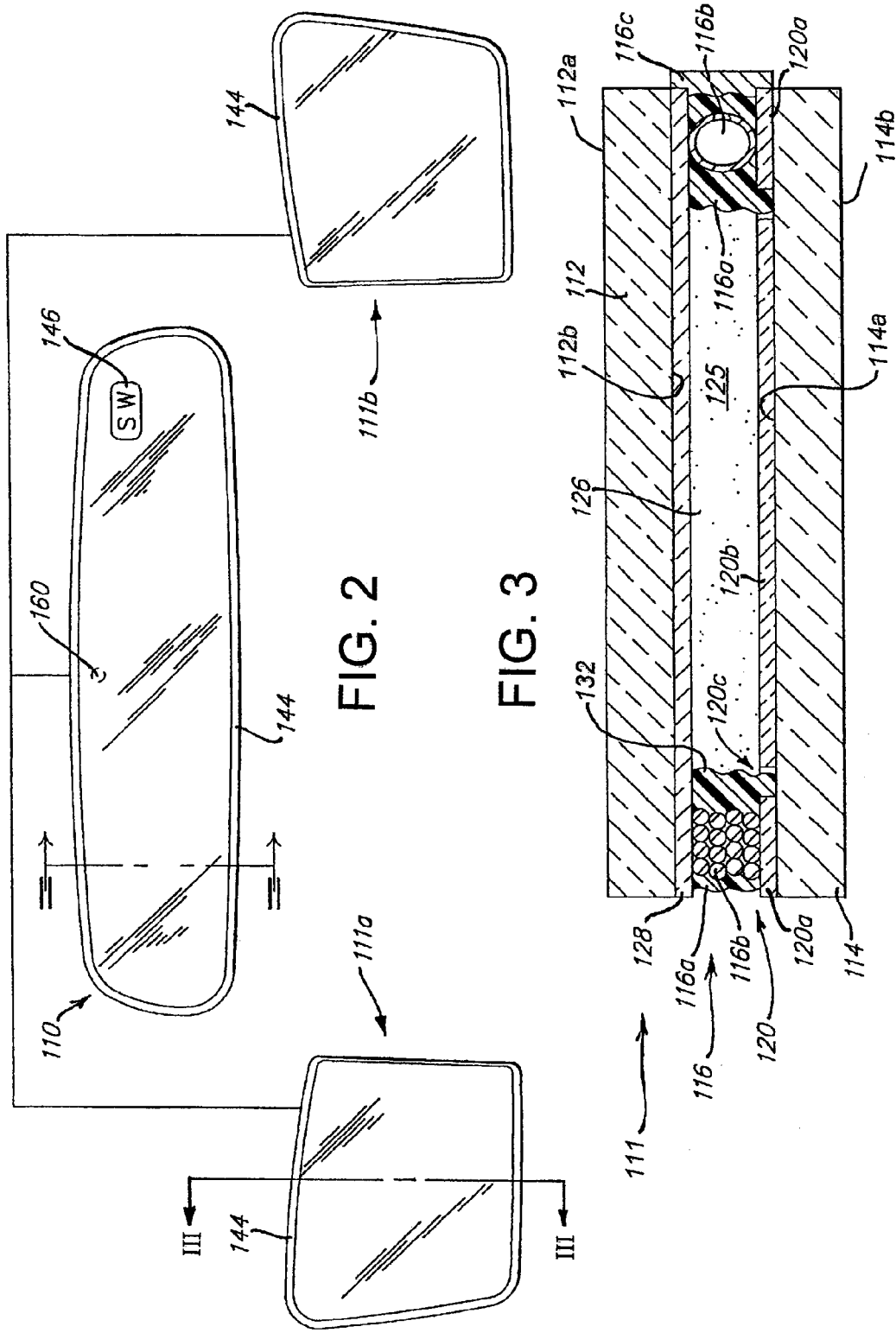

FIG. 8A
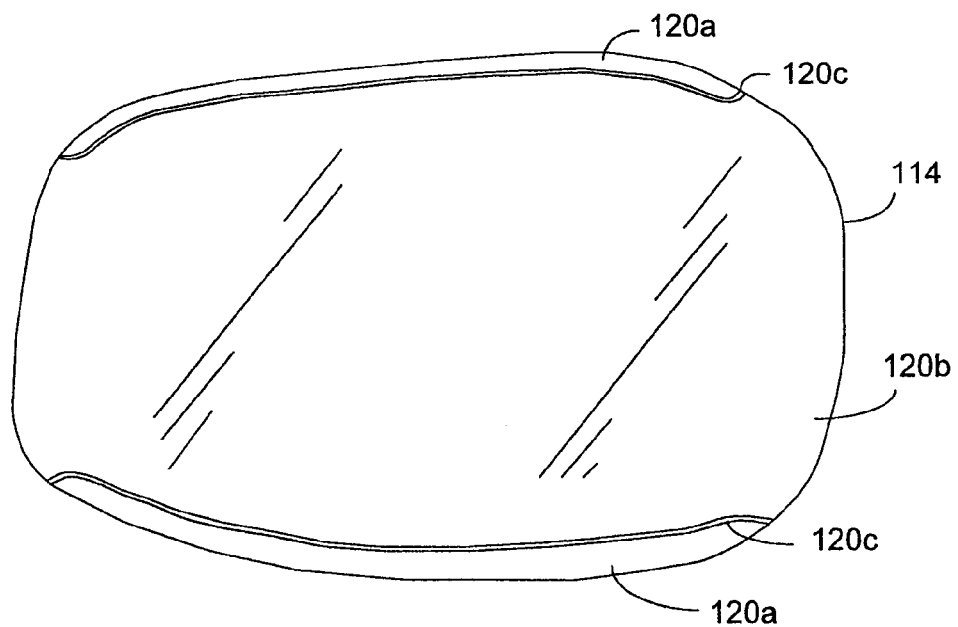
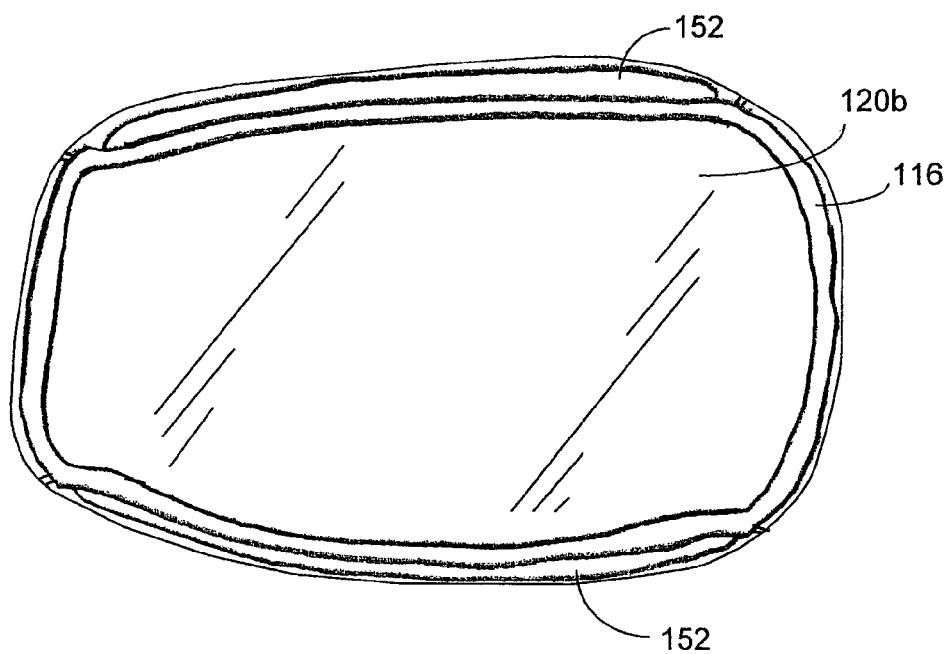
FIG. 8B

ELECTROCHROMIC DEVICE

CROSS-REFERENCE TO RELATED APPLICATIONS

This application is a divisional application of U.S. patent application Ser. No. 10/850,697, filed on May 21, 2004, which is a continuation of U.S. patent application Ser. No. 10/260,741, filed on Sep. 30, 2002, now U.S. Pat. No. 7,064,882, the entire disclosures of which are incorporated herein by reference.

BACKGROUND OF THE INVENTION

The present invention generally relates to electro-optic devices, and more particularly relates to electrochromic devices used in architectural windows or vehicle rearview mirrors.

Electrochromic elements are used in a variety of applications including light shutters, variable attenuating optical filters, and architectural and vehicle windows. The most common application of electrochromic elements is in rearview mirror assemblies used in vehicles. Such electrochromic rearview mirrors are controlled to vary the reflectivity of the mirror in response to rearward and forward aimed light sensors so as to reduce the glare of headlamps in the image reflected to the driver's eyes.

FIG. 1A shows an exploded view of a portion of a rearview mirror subassembly 5 as used in a typical exterior rearview mirror assembly. Subassembly 5 includes an electrochromic mirror element 10, a bezel 50, and a carrier plate 70 (FIG. 1B). The subassembly may further include gaskets 60 and 62, which are placed on either side of electrochromic mirror element 10, which are provided to form a secondary seal around the periphery of the mirror element 10. As best shown in FIG. 1B, electrochromic element 10 includes a front transparent element 12, typically formed of glass, and having a front surface 12a and a rear surface 12b. Electrochromic element 10 further includes a rear element 14, which is spaced slightly apart from element 12. A seal 16 is formed between elements 12 and 14 about their periphery so as to define a sealed chamber therebetween in which an electrochromic medium is provided. Elements 12 and 14 preferably have electrically conductive layers on the surfaces facing the chamber such that an electrical potential may be applied across the electrochromic medium. These electrodes would be electrically isolated from one another and separately coupled to a power source by means of first and second buss connectors 34a and 34b. To facilitate connection of buss connectors 34a and 34b, elements 12 and 14 are typically vertically offset so that one buss connector may be secured along a bottom edge of one of the elements and another buss connector may be secured to the top edge of the other element. The buss connectors 34a and 34b are typically spring clips similar to those disclosed in commonly-assigned U.S. Pat. No. 6,064,509 so as to ensure that they remain physically and electrically coupled to the electrode layers on the inward-facing surfaces of elements 12 and 14. Once the electrochromic element 10 has been manufactured and buss clips 34a and 34b attached, the mirror subassembly 5 may then be assembled. As shown in FIGS. 1A and 1B, bezel 50 includes a front lip 51, which extends over a portion of the front surface 12a of front element 12. Typically, front lip 51 extends over a sufficient portion of front surface 12a to obscure a person's view of seal 16 and protect seal 16 from possible UV degradation. As apparent from FIG. 1B, the width $D_1$ of front lip 51 of bezel 50 is dependent upon a number of factors including the distance $D_2$ of offset of elements 12 and 14. Also, the extent to which buss connector clip 34a and 34b extend beyond the peripheral edges of elements 12 and 14 may require a wider bezel. Typical prior art bezels have a front lip with a width $D_1$ of 5 mm or more.

Prior to inserting electrochromic mirror element 10 in bezel 50, an optional front gasket 60 may be provided behind front lip 51 so as to be pressed between front surface 12a of front element 12 and the inner surface of front lip 51 of bezel 50. Mirror element 10 is then placed in bezel 50 and an optional rear gasket 62 may be provided along the periphery of the back surface of element 14 or the bezel/mirror interface area may be filled or potted with a sealing material like urethane, silicone, or epoxy. A carrier plate 70, which is typically formed of an engineering grade rigid plastic or a similar material as used for bezel 50, is then pressed against the rear surface of element 14 with gasket 62 compressed therebetween. A plurality of tabs 52 may be formed inside of the bezel such that carrier plate 70 is snapped in place so as to secure mirror element 10 within the bezel.

Carrier plate 70 is typically used to mount the mirror subassembly within an exterior mirror housing. More specifically, an optional motor (not shown) may also be mounted within the mirror housing and mechanically coupled to carrier plate 70 for enabling remote adjustment of the position of the mirror subassembly within the housing.

While the above-described structure is readily manufacturable, styling concerns have arisen with respect to the width of the front lip of the bezel of an electrochromic mirror subassembly. Specifically, due to the need to accommodate the buss clips, the positional offset of elements 12 and 14, and to obscure the view of the seal, the width of the front lip of the bezel is typically wider than that of any bezel used on non-dimming (non-electrochromic) mirrors. In fact, bezels are often not used on non-dimming mirrors. In some vehicles, only the exterior mirror on the driver's side is electrochromic, while the passenger side mirror is non-dimming. Thus, there exists the need for an improved electrochromic exterior mirror subassembly that has a reduced bezel front width or that does not include a front bezel at all.

SUMMARY OF THE INVENTION

According to one or more, but not all, embodiments of the present invention, an electrochromic device is provided that comprises: a front element having a front surface and a rear surface having a first layer of electrically conductive material disposed thereon; a rear element having a front surface and a rear surface, the front surface of the rear element having a second layer of electrically conductive material disposed thereon; a seal provided to sealably bond the elements together in a spaced-apart relationship to define a chamber; an electrochromic material disposed in the chamber; and an electrical conductor provided to electrically couple a portion of the first conductive layer with a portion of the second conductive layer, wherein said electrical conductor is provided on an outside peripheral edge of at least one of said front and rear elements.

According to one or more embodiments of the present invention, an electrochromic variable reflectance mirror for a vehicle is provided that comprises: a front element having a front surface and a rear surface having a first layer of electrically conductive material disposed thereon; a rear element having a front surface and a rear surface, the front surface of the rear element having a second layer of electrically conductive material disposed thereon; a seal provided to sealably bond the elements together in a spaced-apart relationship to define a chamber; an electrochromic material disposed in the chamber; and a bezel disposed around the periphery of at least the front element and having front lip extending over part of the front surface of the front element, the front lip of the bezel having a width of about 4 mm or less.

According to one or more embodiments of the present invention, an electrochromic variable reflectance mirror for a vehicle is provided that comprises: a front element having a front surface and a rear surface having a first layer of electrically conductive material disposed thereon; a rear element having a front surface and a rear surface, the front surface of the rear element having a second layer of electrically conductive material disposed thereon; a seal provided to sealably bond the elements together in a spaced-apart relationship to define a chamber; an electrochromic material disposed in the chamber; and an elastomeric bezel disposed around the periphery of at least one of the elements.

According to one or more embodiments of the present invention, an electrochromic device is provided that comprises: a front element having a peripheral edge, a front surface, and a rear surface having a first layer of electrically conductive material disposed thereon; a rear element having a peripheral edge, a front surface, and a rear surface, the front surface of the rear element having a second layer of electrically conductive material disposed thereon; a seal provided to sealably bond the elements together in a spaced-apart relationship to define a chamber; and an electrochromic material disposed in the chamber, wherein an electrically conductive coating is applied to at least a portion of at least one of the peripheral edges.

According to one or more embodiments of the present invention, an electrochromic device is provided that comprises: a front element having a peripheral edge, a front surface, and a rear surface having a first layer of electrically conductive material disposed thereon; a rear element having a peripheral edge, a front surface, and a rear surface, the front surface of the rear element having a second layer of electrically conductive material disposed thereon; a seal provided to sealably bond the elements together in a spaced-apart relationship to define a chamber; an electrochromic material disposed in the chamber; and an electrically conductive wire or strip disposed between the first and second conductive layers and in electrical contact with at least one of the conductive layers.

According to one or more embodiments of the present invention, an electrochromic device is provided that comprises: a front element having a peripheral edge, a front surface, and a rear surface having a first layer of electrically conductive material disposed thereon; a rear element having a peripheral edge, a front surface, and a rear surface, the front surface of the rear element having a second layer of electrically conductive material disposed thereon; a seal provided to sealably bond the elements together in a spaced-apart relationship to define a chamber, wherein the seal has at least two electrically conductive regions; and an electrochromic material disposed in the chamber.

According to one or more embodiments of the present invention, an electrochromic device is provided that comprises: a front element having a peripheral edge, a front surface, and a rear surface having a first layer of electrically conductive material disposed thereon; a rear element having a peripheral edge, a front surface, and a rear surface, the front surface of the rear element having a second layer of electrically conductive material disposed thereon; a seal provided to sealably bond the elements together in a spaced-apart relationship to define a chamber, wherein the seal has at least one electrically conductive region; and an electrochromic material disposed in the chamber, wherein the electrically conductive region of the seal extends less than all of the height of the seal.

According to one or more embodiments of the present invention, an electrochromic device is provided that comprises: a front element having a peripheral edge, a front surface, and a rear surface having a first layer of electrically conductive material disposed thereon; a rear element having a peripheral edge, a front surface, and a rear surface, the front surface of the rear element having a second layer of electrically conductive material disposed thereon; a seal provided on both the front and rear elements to define a sealed chamber between the front and rear elements; and an electrochromic material disposed in the chamber, wherein the seal is predominately on the peripheral edges of the front and rear elements. The seal could be a formed bead of an adhesive such as an epoxy resin applied predominately to the peripheral edges of the elements or it could be a film or foil preferably with low gas permeability such as metal, thin glass, plastic, multi-layer plastic, multi-layer metal and plastic with inorganic layers or coating such as $SiO_2$, $Al_2O_3$, $Ta_2O_5$, Al, chrome, etc. that may be bonded to the edges of the glass elements with an adhesive or glass frit.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 1A is an exploded perspective view of a portion of a conventional exterior electrochromic mirror subassembly;

FIG. 2 is a front elevational view schematically illustrating an inside/outside electrochromic rearview mirror system for motor vehicles, where the outside mirrors incorporate the exterior mirror assembly of the present invention;

FIG. 3 is an enlarged cross-sectional view of an electrochromic mirror element incorporating aspects of a first embodiment of the present invention as taken on the line III-III of FIG. 2;

FIG. 8A is a top plan view of a rear substrate having an electrode formed thereon, as may be used in the electrochromic mirror element shown in FIG. 6;

FIG. 8B is a top plan view of the rear substrate shown in FIG. 8A and additionally having a seal formed thereon, as may be used in the electrochromic mirror element shown in FIG. 6;

DETAILED DESCRIPTION OF THE PREFERRED EMBODIMENTS

Figure 1B:
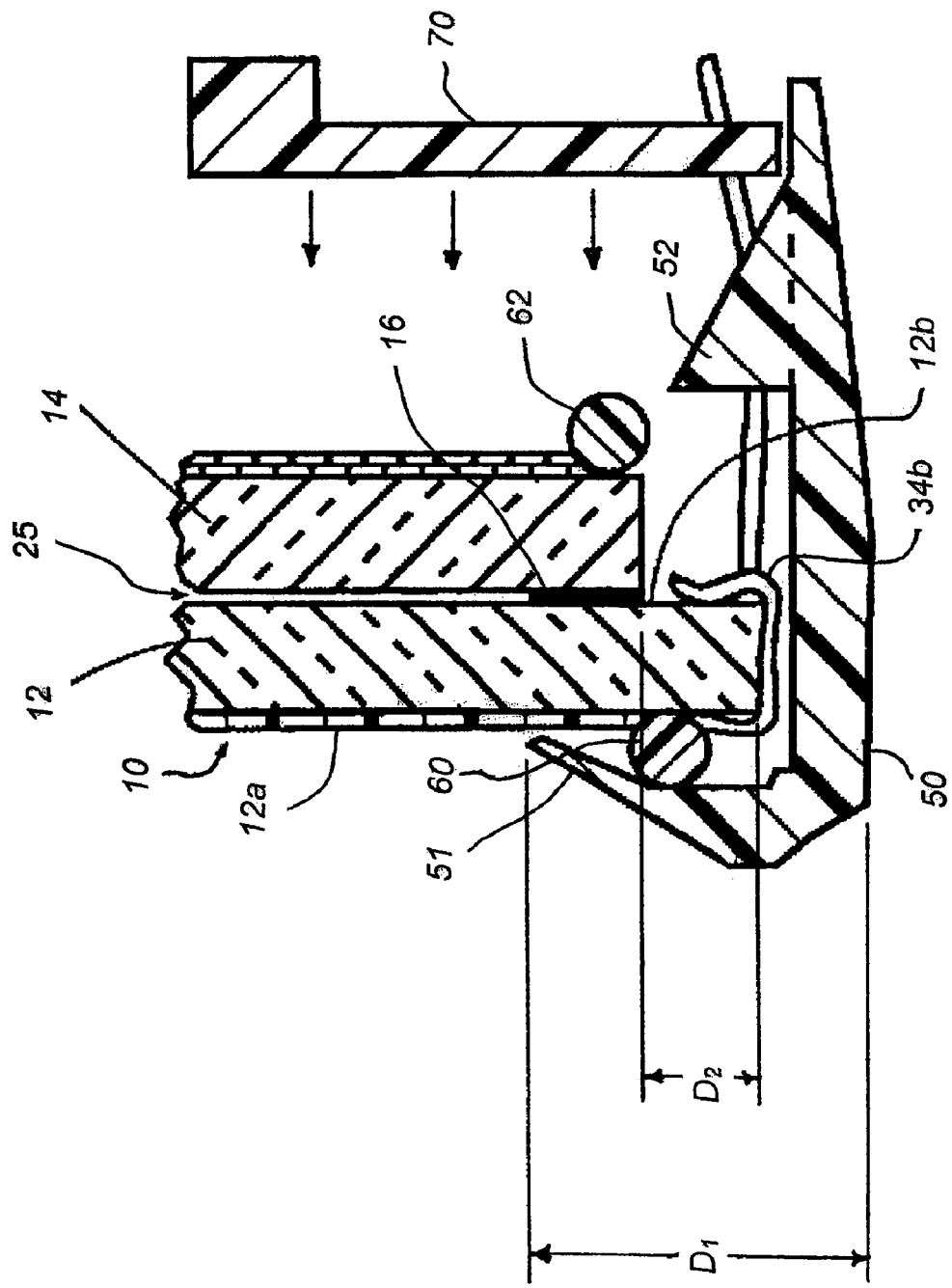
FIG. 1B is an enlarged cross-sectional view of the conventional exterior electrochromic mirror assembly shown in FIG. 1A.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As described above, the electrochromic mirror subassemblies provide the advantage of a reduced bezel front lip width of preferably about 4 mm or less, and more preferably about 3.6 mm, while still extending over all of the seal width, and preferably extending about 0.5 mm beyond an innermost edge of the seal so as to sufficiently obscure the view of the seal. According to some aspects of the present invention, a bezel may not even be utilized due to other inventive techniques for obscuring the view of the seal through the first transparent element. According to other aspects of the invention, inventive bezels are provided that are made of materials that were not previously used to construct bezels.

One of the inventive techniques that is common to most of the embodiments described below is to reduce or eliminate the positional offset of the transparent elements of the electrochromic element so as to enable the bezel width to be correspondingly reduced. Various embodiments are thus described below that accomplish this task through varying novel means of electrical coupling to the electrodes of the electrochromic device. The various embodiments are described in detail below, following a general overview of the structural elements that may be common to each of the embodiments.

FIG. 2 shows a front elevational view schematically illustrating an interior mirror assembly 110 and two exterior rearview mirror assemblies 111a and 111b for the driver side and passenger side, respectively, all of which are adapted to be installed on a motor vehicle in a conventional manner and where the mirrors face the rear of the vehicle and can be viewed by the driver of the vehicle to provide a rearward view. Interior mirror assembly 110 and exterior rearview mirror assemblies 111a and 111b may incorporate light-sensing electronic circuitry of the type illustrated and described in the above-referenced Canadian Patent No. 1,300,945, U.S. Pat. Nos. 5,204,778, 5,451,822, 6,402,328, or 6,386,713 and other circuits capable of sensing glare and ambient light and supplying a drive voltage to the electrochromic element.

Mirror assemblies 110, 111a, and 111b are essentially identical in that like numbers identify components of the inside and outside mirrors. These components may be slightly different in configuration, but function in substantially the same manner and obtain substantially the same results as similarly numbered components. For example, the shape of the front glass element of inside mirror 110 is generally longer and narrower than outside mirrors 111a and 111b. There are also some different performance standards placed on inside mirror 110 compared with outside mirrors 111a and 111b. For example, inside mirror 110 generally, when fully cleared, should have a reflectance value of about 70 percent to about 85 percent or higher, whereas the outside mirrors often have a reflectance of about 50 percent to about 65 percent. Also, in the United States (as supplied by the automobile manufacturers), the passenger-side mirror 111b typically has a spherically bent or convex shape, whereas the driver-side mirror 111a and inside mirror 110 presently must be flat. In Europe, the driver-side mirror 111a is commonly flat or aspheric, whereas the passenger-side mirror 111b has a convex shape. In Japan, both outside mirrors have a convex shape. While the focus of the invention is generally towards exterior mirrors, the following description is generally applicable to all mirror assemblies of the present invention including inside mirror assemblies. Moreover, certain aspects of the present invention may be implemented in electrochromic elements used in other applications such as architectural windows, or the like, or even in other forms of electro-optic devices.

FIG. 3 shows a cross-sectional view of an exterior mirror assembly 111 constructed in accordance with a first embodiment of the present invention, which includes a front transparent element 112 having a front surface 112a and a rear surface 112b, and a rear element 114 having a front surface 114a and a rear surface 114b. For clarity of description of such a structure, the following designations will be used hereinafter. The front surface 112a of the front glass element will be referred to as the first surface, and the back surface 112b of the front glass element as the second surface. The front surface 114a of the rear glass element will be referred to as the third surface, and the back surface 114b of the rear glass element as the fourth surface. A chamber 125 is defined by a layer of transparent conductor 128 (carried on second surface 112b), an electrode 120 (disposed on third surface 114a), and an inner circumferential wall 132 of sealing member 116. An electrochromic medium 126 is contained within chamber 125.

As broadly used and described herein, the reference to an electrode or layer as being "carried" on a surface of an element refers to both electrodes or layers that are disposed directly on the surface of an element or disposed on another coating, layer or layers that are disposed directly on the surface of the element.

Front transparent element 112 may be any material which is transparent and has sufficient strength to be able to operate in the conditions, e.g., varying temperatures and pressures, commonly found in the automotive environment. Front element 112 may comprise any type of borosilicate glass, soda lime glass, float glass, or any other material, such as, for example, a polymer or plastic, that is transparent in the visible region of the electromagnetic spectrum. Front element 112 is preferably a sheet of glass. The rear element must meet the operational conditions outlined above, except that it does not need to be transparent in all applications, and therefore may comprise polymers, metals, glass, ceramics, and preferably is a sheet of glass.

The electrode 120 on the third surface 114a are sealably bonded to the electrode 128 on the second surface 112b in a spaced-apart and parallel relationship by a seal member 116 disposed near the outer perimeter of both second surface 112b and third surface 114a. Seal member 116 may be any material that is capable of adhesively bonding the coatings on the second surface 112b to the coatings on the third surface 114a to seal the perimeter such that electrochromic material 126 does not leak from chamber 125. As described below, the layer of transparent conductive coating 128 and/or the layer of electrode 120 may be removed over a portion where the seal member is disposed. In such a case, seal member 116 should bond well to glass.

The performance requirements for a perimeter seal member 116 used in an electrochromic device are similar to those for a perimeter seal used in a liquid crystal device (LCD), which are well known in the art. The seal must have good adhesion to glass, metals and metal oxides; must have low permeabilities for oxygen, moisture vapor, and other detrimental vapors and gases; and must not interact with or poison the electrochromic or liquid crystal material it is meant to contain and protect. The perimeter seal can be applied by means commonly used in the LCD industry, such as by silk-screening or dispensing. Because of their lower processing temperatures, thermoplastic, thermosetting or UV curing organic sealing resins are preferred. Such organic resin sealing systems for LCDs are described in U.S. Pat. Nos. 4,297,401, 4,418,102, 4,695,490, 5,596,023, and 5,596,024. Because of their excellent adhesion to glass, low oxygen permeability and good solvent resistance, epoxy-based organic sealing resins are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional, and multi-functional epoxy resins and curing agents. Additives such as silanes, titanates, or sulfur or phosphorous compounds can be used to improve the seal's hydrolytic stability and adhesion, and spacers such as glass or plastic beads or rods can be used to control final seal thickness and substrate spacing. Suitable epoxy resins for use in a perimeter seal member 116 include, but are not limited to: "EPON RESIN" 813, 825, 826, 828, 830, 834, 862, 1001F, 1002F, 2012, DPS-155, 164, 1031, 1074, 58005, 58006, 58034, 58901, 871, 872, and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510, and PT 810 available from Ciba Geigy, Hawthorne, N.Y.; and "D.E.R." 331, 317, 361, 383, 661, 662, 667, 732, 736, "D.E.N." 354, 354LV, 431, 438, 439 and 444 available from Dow Chemical Co., Midland, Mich. Suitable epoxy curing agents include V-15, V-25, and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z, C17Z, 2PZ, 2IZ, and 2P4MZ available from Shikoku Fine Chemicals, Tokyo, Japan; "ERISYS" DDA or DDA accelerated with U-405, 24EMI, U-410, and U-415 available from CVC Specialty Chemicals, Maple Shade, N.J.; and "AMICURE" PACM, 2049, 352, CG, CG-325, and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, and EH-5 available from Cabot Corporation, Tuscola, Ill.; "AEROSIL" R972, R974, R805, R812, R812 S, R202, US204, and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, and TRANSLINK 555 available from Engelhard Corporation, Edison, N.J. Suitable silica fillers are SILCRON G-130, G-300, G-100-T, and G-100 available from SCM Chemicals, Baltimore, Md. Suitable silane coupling agents to improve the seal's hydrolytic stability are Z-6020, Z-6030, Z-6032, Z-6040, Z-6075, and Z-6076 available from Dow Corning Corporation, Midland, Mich. Suitable precision glass microbead spacers are available in an assortment of sizes from Duke Scientific, Palo Alto, Calif. The seal may be constructed in accordance with the teachings in U.S. Pat. Nos. 5,790,298 and 6,157,480, the entire disclosures of which are incorporated herein by reference.

Another suitable way to maintain precision spacing between the two pieces of glass is by adding plastic fibers to the seal material. These fibers if cut from monofilament in an aspect ratio of about 2.5 to 3 to 1 (length to diameter) are particularly effective in keeping the two substrates from sliding during the seal cure process. The glass spheres act as ball bearings that can enable movement between the substrates during seal cure. Plastic fibers made of high temperature polyester (PEN) or polyetherimide (Ultem) when added to the seal material at around a 1% by weight loading help prevent substrate movement because they are randomly orientated and some will not be positioned to roll. These plastic spacers have another benefit in that they more closely match the thermal expansion of cured organic seal material and consequently will generate less seal stress during thermal cycling.

The layer of a transparent electrically conductive material 128 is deposited on the second surface 112b to act as an electrode. Transparent conductive material 128 may be any material which bonds well to front element 112, is resistant to corrosion to any materials within the electrochromic device, is resistant to corrosion by the atmosphere or road salts, has minimal diffuse or specular reflectance, high light transmission, near neutral coloration, and good electrical conductance. Transparent conductive material 128 may be fluorine-doped tin oxide, doped zinc oxide, indium zinc oxide ($Zn_3In_2O_6$), indium tin oxide (ITO), ITO/metal/ITO (IMI) as disclosed in "Transparent Conductive Multilayer-Systems for FPD Applications," by J. Stollenwerk, B. Ocker, K. H. Kretschmer of LEYBOLD AG, Alzenau, Germany, the materials described in above-referenced U.S. Pat. No. 5,202,787, such as TEC 20 or TEC 15, available from Libbey-Owens-Ford Co. of Toledo, Ohio, other transparent conductive metal oxides, or other transparent conductors. Generally, the conductance of transparent conductive material 128 will depend on its thickness and composition. IMI generally has superior conductivity compared with the other materials. IMI, however, is known to undergo more rapid environmental degradation and suffer from interlayer delamination. The thicknesses of the various layers in the IMI structure may vary, but generally the thickness of the first ITO layer ranges from about 10 Å to about 200 Å, the metal ranges from about 10 Å to about 200 Å, and the second layer of ITO ranges from about 10 Å to about 200 Å. If desired, an optional layer or layers of a color suppression material (not shown) may be deposited between transparent conductive material 128 and the second surface 112b to suppress the reflection of any unwanted portions of the electromagnetic spectrum.

A combination reflector/electrode 120 is preferably disposed on third surface 114a. Reflector/electrode 120 comprises at least one layer of a reflective material, which serves as a mirror reflectance layer and also forms an integral electrode in contact with and in a chemically and electrochemically stable relationship with any constituents in an electrochromic medium. Reflector/electrode may be mostly reflective or may be partially transmissive/partially reflective (or "transflective") as disclosed in commonly-assigned U.S. patent application Ser. No. 10/115,860, filed on Apr. 3, 2002, entitled "ELECTROCHROMIC REARVIEW MIRROR ASSEMBLY INCORPORATING A DISPLAY/SIGNAL LIGHT," by William L. Tonar et al., now U.S. Pat. No. 6,700,692, the entire disclosure of which is incorporated herein by reference. As an alternative, the electrochromic device could incorporate a transparent conductive material on the third surface, which acts as an electrode, and incorporate a reflector on the fourth surface. However, combining the "reflector" and "electrode" and placing both on the third surface is preferred because it makes the device manufacture less complex and allows the device to operate with higher performance. The combined reflector/electrode 120 on the third surface generally has higher conductance than a conventional transparent electrode as used on the third surface. One can either change the composition of the transparent conductive electrode on the second surface to one that has lower conductance (being cheaper and easier to produce and manufacture) while maintaining coloration speeds similar to that obtainable with a fourth surface reflector device, while at the same time decreasing substantially the overall cost and time to produce the electrochromic device. If, however, performance of a particular design is of utmost importance, a moderate to high conductance transparent electrode can be used on the second surface, such as, for example, ITO, IMI, etc. The combination of a high conductance (i.e., less than 250 Ω/▫, preferably less than 15 Ω/▫) reflector/electrode on the third surface and a high conductance transparent electrode on the second surface will not only produce an electrochromic device with more even overall coloration, but will also allow for increased speed of coloration and clearing. Furthermore, in fourth surface reflector mirror assemblies, there are two transparent electrodes with relatively low conductance, and in previously used third surface reflector mirrors, there is a transparent electrode and a reflector/electrode with relatively low conductance and, as such, a long buss bar on the front and rear element to bring current in and out is necessary to ensure adequate coloring speed. The third surface electrode of the present invention is metallic and may have a higher conductance and therefore has a very even voltage or potential distribution across the conductive surface, even with a small or irregular contact area. Thus, the present invention provides greater design flexibility by allowing the electrical contact for the third surface electrode to be very small (if desired) while still maintaining adequate coloring speed.

It is desirable in the construction of outside rearview mirrors to incorporate thinner glass in order to decrease the overall weight of the mirror so that the mechanisms used to manipulate the orientation of the mirror are not overloaded. Decreasing the weight of the device also improves the dynamic stability of the mirror assembly when exposed to vibrations. Alternatively, decreasing the weight of the mirror element may permit more electronic circuitry to be provided in the mirror housing without increasing the weight of the mirror housing. Thin glass may be prone to warpage or breakage, especially when exposed to extreme environments. This problem is substantially improved by using an improved electrochromic device incorporating two thin glass elements having an improved gel material. This improved device is disclosed in commonly assigned U.S. Pat. No. 5,940,201 entitled "ELECTROCHROMIC MIRROR WITH TWO THIN GLASS ELEMENTS AND A GELLED ELECTROCHROMIC MEDIUM," filed on Apr. 2, 1997. The entire disclosure of this patent is incorporated herein by reference. The addition of the combined reflector/electrode onto the third surface of the device further helps remove any residual double imaging resulting from the two glass elements being out of parallel. Thus, chamber 125 preferably contains a free-standing gel that cooperatively interacts with thin glass elements 112 and 114 to produce a mirror that acts as one thick unitary member rather than two thin glass elements held together only by a seal member. In free-standing gels, which contain a solution and a cross-linked polymer matrix, the solution is interspersed in a polymer matrix and continues to function as a solution. Also, at least one solution-phase electrochromic material is in solution in the solvent and therefore as part of the solution is interspersed in the polymer matrix (this generally being referred to as "gelled electrochromic medium" 126). This allows one to construct a rearview mirror with thinner glass in order to decrease the overall weight of the mirror while maintaining sufficient structural integrity so that the mirror will survive the extreme conditions common to the automobile environment. This also helps maintain uniform spacing between the thin glass elements, which improves uniformity in the appearance (e.g., coloration) of the mirror. This structural integrity results because the free-standing gel, the first glass element 112, and the second glass element 114, which individually have insufficient strength characteristics to work effectively in an electrochromic mirror, couple in such a manner that they no longer move independently but act as one thick unitary member. This stability includes, but is not limited to, resistance to flexing, warping, bowing and breaking, as well as improved image quality of the reflected image, e.g., less distortion, double image, color uniformity, and independent vibration of each glass element. However, while it is important to couple the front and rear glass elements, it is equally important (if not more so) to ensure that the electrochromic mirror functions properly. The free-standing gel must bond to the electrode layers (including the reflector/electrode if the mirror has a third surface reflector) on the walls of such a device, but not interfere with the electron transfer between the electrode layers and the electrochromic material(s) disposed in the chamber 125. Further, the gel must not shrink, craze, or weep over time such that the gel itself causes poor image quality. Ensuring that the free-standing gel bonds well enough to the electrode layers to couple the front and rear glass elements and does not deteriorate over time while allowing the electrochromic reactions to take place as though they were in solution, is an important aspect of the present invention.

To perform adequately, a mirror must accurately represent the reflected image, and this cannot be accomplished when the glass elements (to which the reflector is attached) tend to bend or bow while the driver is viewing the reflected image. The bending or bowing occurs mainly due to pressure points exerted by the mirror mounting and adjusting mechanisms and by differences in the coefficients of thermal expansion of the various components that are used to house the exterior mirror element. These components include a carrier plate used to attach the mirror element to the mechanism used to manipulate or adjust the position of the mirror (bonded to the mirror by an adhesive), a bezel, and a housing. Many mirrors also typically have a potting material as a secondary seal. Each of these components, materials, and adhesives has varying coefficients of thermal expansion that will expand and shrink to varying degrees during heating and cooling and will exert stress on the glass elements 112 and 114. On very large mirrors, hydrostatic pressure becomes a concern and may lead to double imaging problems when the front and rear glass elements bow out at the bottom and bow in at the top of the mirror. By coupling the front and rear glass elements, the thin glass/free-standing gel/thin glass combination acts as one thick unitary member (while still allowing proper operation of the electrochromic mirror) and thereby reduces or eliminates the bending, bowing, flexing, double image, and distortion problems and non-uniform coloring of the electrochromic medium.

The cooperative interaction between the free-standing gel and the thin glass elements of the present invention also improves the safety aspects of the electrochromic mirror 110 having thin glass elements. In addition to being more flexible, thin glass is more prone to breakage than thick glass. By coupling the free-standing gel with the thin glass, the overall strength is improved (as discussed above) and further restricts shattering and scattering and eases clean-up in the case of breakage of the device.

The improved cross-linked polymer matrix used in the present invention is disclosed in commonly assigned U.S. Pat. No. 5,928,572 entitled "ELECTROCHROMIC LAYER AND DEVICES COMPRISING SAME" filed on Mar. 15, 1996. The entire disclosure of this patent is incorporated herein by reference.

Typically, electrochromic mirrors are made with glass elements having a thickness of about 2.3 mm. The preferred thin glass elements according to the present invention have thicknesses of about 1.0 mm, which results in a weight savings of more than 50 percent. This decreased weight ensures that the mechanisms used to manipulate the orientation of the mirror, commonly referred to as carrier plates, are not overloaded and further provides significant improvement in the vibrational stability of the mirror.

Front transparent element 112 is thus preferably a sheet of glass with a thickness ranging from 0.5 mm to about 1.8 mm, preferably from about 0.5 mm to 1.6 mm, more preferably from about 0.5 mm to 1.5 mm, even more preferably from about 0.8 mm to about 1.2 mm, with the presently most preferred thickness about 1.0 mm. Rear element 114 preferably is a sheet of glass with a thickness in the same ranges as element 112.

When both glass elements are made thin, the vibrational properties of an interior or exterior mirror improve—although the effects are more significant for exterior mirrors. These vibrations that result from the engine running and/or the vehicle moving affect the rearview mirror, such that the mirror essentially acts as a weight on the end of a vibrating cantilever beam. This vibrating mirror causes blurring of the reflected image that is a safety concern as well as a phenomenon that is displeasing to the driver. As the weight on the end of the cantilever beam (i.e., the mirror element attached to the carrier plate on the outside mirror or the mirror mount on the inside mirror) is decreased, the frequency at which the mirror vibrates increases. If the frequency of the mirror vibration increases to around 60 Hertz, the blurring of the reflected image is not visually displeasing to the vehicle occupants. Moreover, as the frequency at which the mirror vibrates increases, the distance the mirror travels while vibrating decreases significantly. Thus, by decreasing the weight of the mirror element, the complete mirror becomes more vibrationally stable and improves the ability of the driver to view what is behind the vehicle. For example, an interior mirror with two glass elements having a thickness of 1.1 mm has a first mode horizontal frequency of about 55 Hertz whereas a mirror with two glass elements of 2.3 mm has a first mode horizontal frequency of about 45 Hertz. This 10 Hertz difference produces a significant improvement in how a driver views a reflected image.

A resistive heater (not shown) may be disposed on the fourth glass surface 114b to heat the mirror and thereby clear the mirror of ice, snow, fog, or mist. The resistive heater may optionally be a layer of ITO, fluorine-doped tin oxide applied to the fourth surface, or may be other heater layers or structures well known in the art.

Referring again to FIG. 2, rearview mirrors embodying aspects of the present invention may include a housing or bezel 144, which extends around the entire periphery of each individual assembly 110, 111a, and/or 111b. The bezel 144 conceals and protects the spring clips (if present) and the seal. A wide variety of bezel designs are well known in the art, such as, for example, the bezel taught and claimed in above-referenced U.S. Pat. No. 5,448,397.

An electrical circuit such as those taught in the above-referenced Canadian Patent No. 1,300,945 and U.S. Pat. Nos. 5,204,778, 5,434,407, 5,451,822, 6,402,328, and 6,386,713, is connected to and allows control of the potential to be applied across electrode 120 and transparent electrode 128, such that electrochromic medium 126 will darken and thereby attenuate various amounts of light traveling therethrough and thus vary the reflectance of the mirror containing electrochromic medium 126. The electrical circuit used to control the reflectivity of the electrochromic mirrors preferably incorporates an ambient light sensor (not shown) and a glare light sensor 160, the glare light sensor being positioned either behind the mirror glass and looking through a section of the mirror with the reflective material completely or partially removed, or the glare light sensor can be positioned outside the reflective surfaces, e.g., in the bezel 144 or as described below, the sensor can be positioned behind a uniformly deposited transflective coating. Additionally, an area or areas of the electrode and reflector, such as 146, may be completely removed or partially removed as described below to permit a vacuum fluorescent display, such as a compass, clock, or other indicia, to show through to the driver of the vehicle or as also described below, this light emitting display assembly can be shown through a uniformly deposited transflective coating. The present invention is also applicable to a mirror which uses only one video chip light sensor to measure both glare and ambient light and which is further capable of determining the direction of glare. An automatic mirror on the inside of a vehicle, constructed according to this invention, can also control one or both outside mirrors as slaves in an automatic mirror system.

Figure 4:
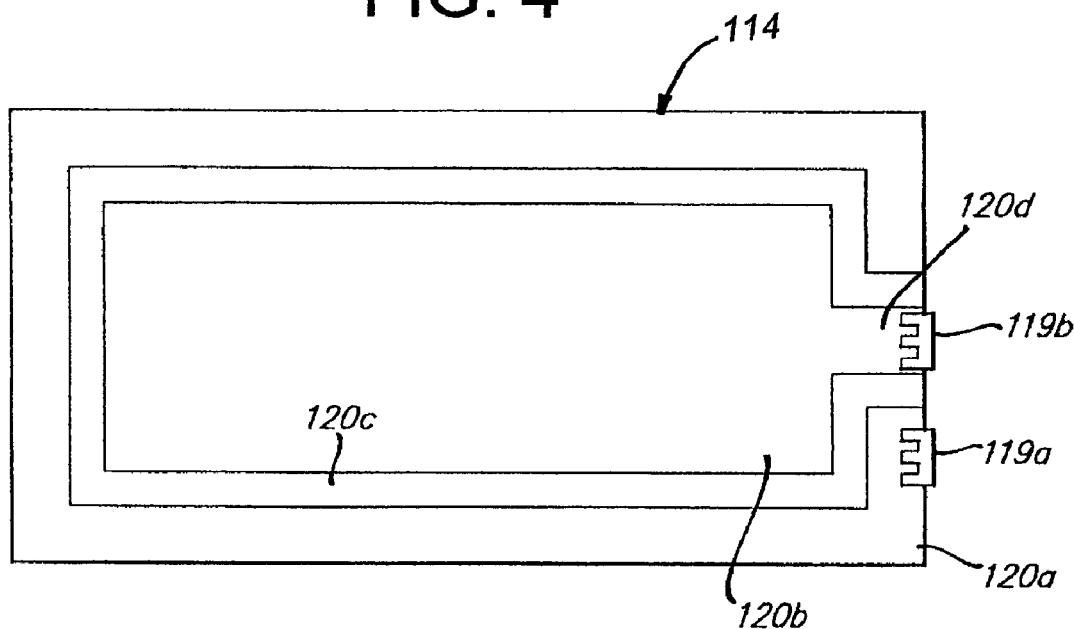
FIG. 4 is a top plan view of a rear substrate having an electrode formed thereon, as may be used in the electrochromic mirror element shown in FIG. 3.

The features of the first embodiment of the invention are described below with respect to FIGS. 3 and 4. FIG. 4 shows a top plan view of the second transparent element 114 with electrode 120 deposited thereon, as may be used with the structure shown in FIG. 3. As shown in FIG. 4, the electrode 120 is separated into two distinct electrode areas—a first portion 120a and a second portion 120b, electrically isolated and physically separated by an area 120c devoid of electrode material or any other electrically conductive material. The electrode material should not be present in area 120c, so that there is no chance of current flow directly from first portion 120a to second portion 120b. There are many methods of removing the electrode material 120 from area 120c, such as, for example, chemical etching, laser ablating, physical removal by scraping, etc. Deposition in area 120c can also be avoided by use of a mask during deposition of electrode.

As shown in FIG. 3, second portion 120b of electrode 120 is in electrical contact with the electrochromic medium 126 at the third surface 114a of the electrochromic device, while first portion 120a is physically isolated from electrochromic medium 126 by either area 120c, seal 116, or both. First portion 120a, however, is electrically coupled to a portion of the transparent electrode 128 on the second surface 112b of the electrochromic device by means of an electrical conductor, which may extend around some or most of the periphery of the seal. Thus, a short circuit is effectively provided between portions of electrode layers 120 and 128. This short circuit allows the buss clip normally attached to the peripheral edge of the first transparent element 112 to instead be attached to the second element 114. More specifically, electrical connection between the power supply and transparent electrode 128 on the second surface may be made by connecting the buss bars (or clips 119a) to the first portion 120a of electrode layer 120. Electrical connection to second portion 120b may be made using a clip 119b that is attached to an extension 120d of portion 120b that extends to the peripheral edge of element 114. This configuration is advantageous in that it allows connection to the transparent conductive material 128 nearly all the way around the circumference, and therefore improves the speed of dimming and clearing of the electrochromic media 126. As will be described further below with respect to other embodiments, clips 119a and 119b may be replaced with other forms of electrical connectors.

FIG. 3 shows two different forms of electrical conductors for coupling the first portion 120a of electrode 120 to a portion of electrode 128. As shown on the left side of the device, conductive particles 116b may be distributed through part of the seal material 116 such that a portion of seal 116 is electrically conductive. Seal 116 is preferably not electrically conductive across its entire width, but rather electrically insulates the conductive portion of the seal from the electrochromic medium 126 and does not provide a short circuit between electrode 128 and second portion 120b of electrode 120. In this manner, the drive potential from the power supply travels through the first portion 120a of electrode 120 and conductive particles 116b in seal 116 before reaching transparent conductor 128.

In such a configuration, seal 116 comprises a typical sealing material, e.g., epoxy 116a, with the conductive particles 116b contained therein. The conductive particles may be small, such as, for example, gold, silver, copper, etc. coated plastic with a diameter ranging from about 5 microns to about 80 microns, in which case there must be a sufficient number of particles to ensure sufficient conductivity between the first portion 120a of electrode 120 and the transparent electrode 128. Alternatively, the conductive particles may be large enough to act as spacers, such as, for example, gold, silver, copper, etc., coated glass or plastic beads. The conductive particles may further be in the form of flakes or other suitable shapes or combination of different shapes.

A variety of methods can be used to ensure that no conductive particles 116b enter into area 120b, such as, for example, disposing a nonconductive material into the area 120c of electrode 120 that is devoid of conductive material. A dual dispenser could be used to deposit the seal 116 with conductive particles 116b onto first portion 120a and simultaneously deposit the nonconductive material into electrode area 120c. A general method of ensuring that no conductive particles reach electrode area 120b is to make sure seal 116 has proper flow characteristics, such that the conductive portion 116b tends to stay behind as the sealant is squeezed out during assembly, and only the non-conductive portion of 116 flows into area 120b. Another method would be to dispense the non-conductive seal material(s) between the substrates, separately cure the dispensed non-conductive seal, and then inject the conductive epoxy between the two substrates.

In an alternative implementation shown in the right side of the device of FIG. 3, a larger electrical conductor 116b is provided, which may also serve as a spacer. Such a larger electrical conductor may be a single wire, a braided wire, a conductive strip, or simply large particles or beads that are either electrically conductive throughout or coated with an electrically conductive material.

Seal 116 need not contain conductive particles or other electrical conductor 116b and, instead, a conductive member or material 116c may be placed on or in the outer edge of seal 116 to interconnect transparent conductive material 128 to first portion 120a of electrode 120. Such a conductive member 116c may be used in combination with conductors in the seal or otherwise between elements 112 and 114.

Figure 5:
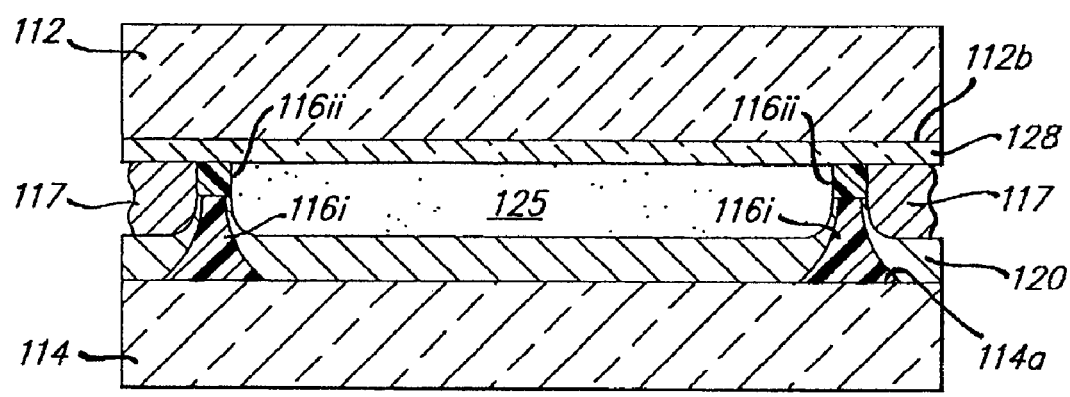
FIG. 5 is an enlarged cross-sectional view of an electrochromic mirror element incorporating aspects of a second embodiment of the present invention.

Yet another embodiment of an improved electrical interconnection technique is illustrated in FIG. 5, where a first portion of seal member 116 is applied directly onto the third surface 114a and cured prior to the application of electrode 120. After the electrode 120 is deposited onto the third surface 114a over the first portion of seal member 116, a portion of the cured seal member 116 is machined off to leave 116i as shown with a predetermined thickness (which will vary depending on the desired cell spacing between the second surface 112b and the third surface 114a). The cell spacing ranges from about 20 microns to about 1500 microns, and preferably ranges from about 90 microns to about 750 microns. By curing the first portion of seal member and machining it to a predetermined thickness (116i), the need for glass beads to ensure a constant cell spacing is eliminated. Glass beads are useful to provide cell spacing, however, they provide stress points where they contact electrode 120 and transparent conductor 128. By removing the glass beads, these stress points are also removed. During the machining, the electrode 120 that is coated on first portion of seal member 116 is removed to leave an area devoid of electrode 120. A second portion of seal member 116ii is then deposited onto the machined area of the first portion of seal member 116i or on the coatings on second surface 112b in the area corresponding to 116i, and seal member 116ii is cured after assembly in a conventional manner. Finally, an outer electrically conductive seal member 117 may optionally be deposited on the outer peripheral portion of seal member 116 to make electrical contact between the outer edge of electrode 120 and the outer peripheral edge of the layer of transparent conductive material 128. This configuration is advantageous in that it allows connection to the transparent conductive material 128 nearly all the way around the circumference, and therefore improves the speed of dimming and clearing of the electrochromic media 126.

Figure 6:
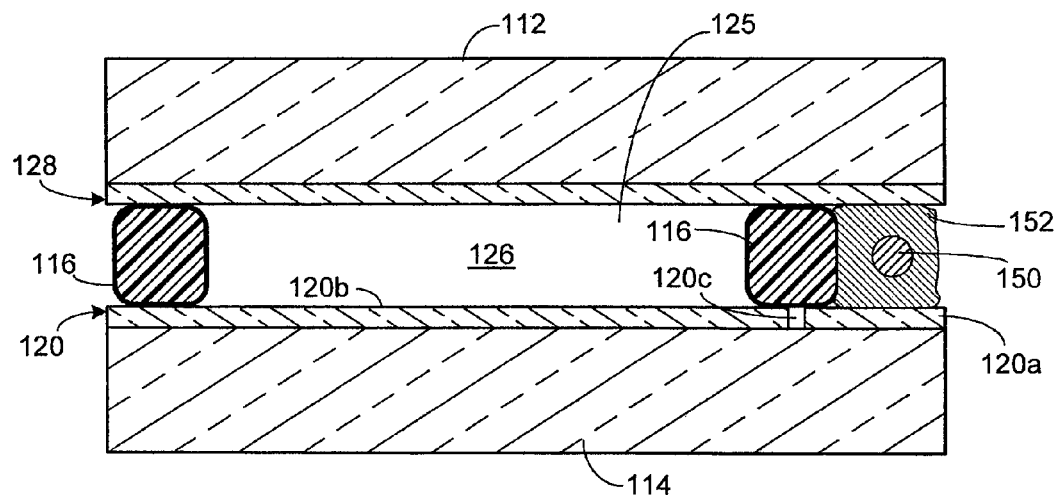
FIG. 6 is an enlarged cross-sectional view of an electrochromic mirror element incorporating aspects of a second embodiment of the present invention.
Figure 7A:
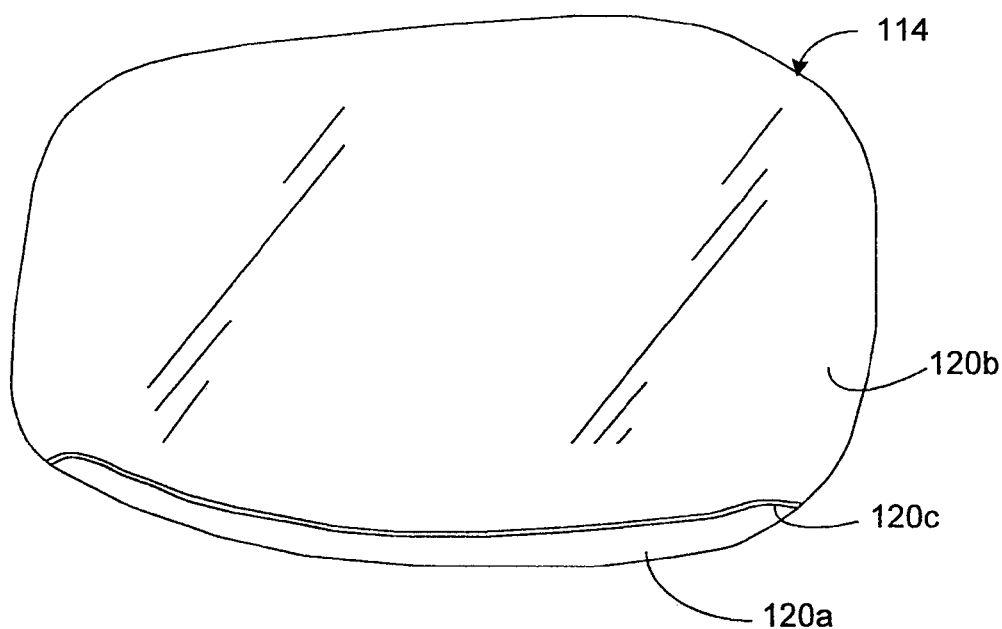
FIG. 7A is a top plan view of a rear substrate having an electrode formed thereon, as may be used in the electrochromic mirror element shown in FIG. 6.
Figure 7B:
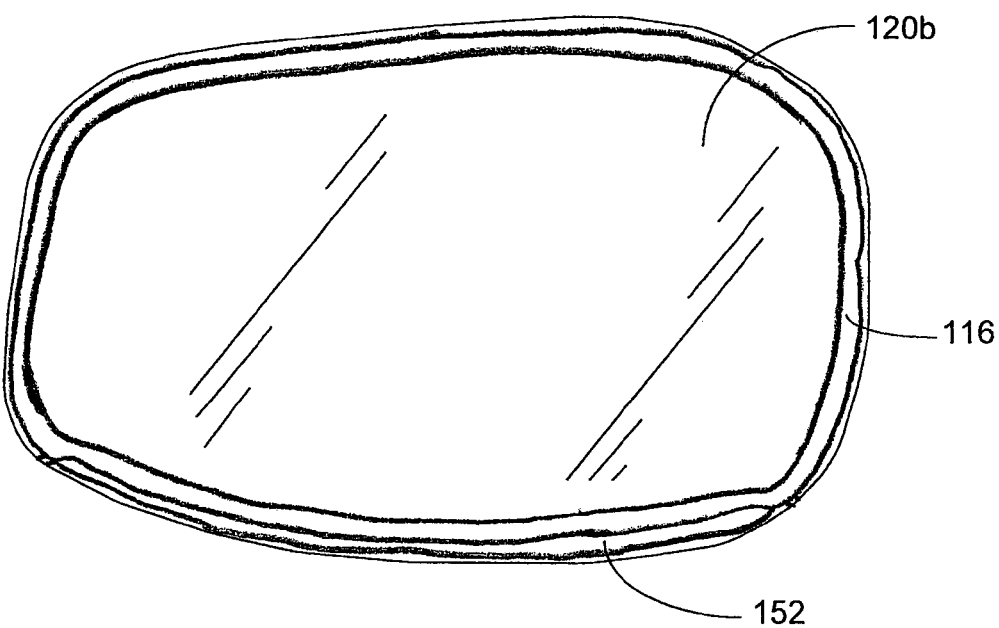
FIG. 7B is a top plan view of the rear substrate shown in FIG. 7A and additionally having a seal formed thereon, as may be used in the electrochromic mirror element shown in FIG. 6.

A third embodiment of the present invention is shown in FIG. 6. The third embodiment differs from the prior two embodiments in that the electrical conductor that connects a first portion 120a of electrode 120 to the portion of transparent electrode 128 is a wire 150 or strip, which may be coated with a conductive material 152 to improve contact to the electrode layers and to thereby ensure contact stability. The conductive material 152 may be conductive pressure sensitive adhesive (PSA), conductive ink, or an epoxy that is loaded with conductive particles, flakes, or fibers made of materials such as silver, gold, copper, nickel, or carbon. If conductive material 152 has sufficient conductivity, wire 150 would not be needed. Like the first two embodiments, electrode 120 is separated into a first portion 120a and a second portion 120b by an area 120c that is devoid of electrically conductive material. FIG. 7A shows a top plan view of rear element 114 having electrode coating 120 deposited thereon. To create the first and second portions, laser ablation, chemical etching, physical removal by scraping, or similar methods may be used to remove a portion of the electrode material to form a thin line defining area 120c. As shown in FIG. 7A, this would define a first portion 120a along one side of element 114. As shown in FIG. 7B, the electrically non-conductive seal 116 is formed about the entire periphery to define the outer bounds of the chamber 125 in which the electrochromic medium 126 is deposited. The conductive material 152, which may also function as a seal, is then disposed with or without a wire 150 along the peripheral edge on which first portion 120a of electrode 120 is defined. Conductive material 152 may be deposited prior to or after substrates 112 and 114 are assembled together.

An alternative construction is shown in FIGS. 8A and 8B in which two first portions 120a are defined at opposite sides of element 114 and separated by corresponding nonconductive lines 120c. Such an arrangement would allow for electrical connection to electrode 128 at two opposite sides of element 114. The seals 116 and 152 would be disposed in a similar manner, but with the conductive seal 152 dispensed over all or part of both portions 120a. The wire(s) may extend from conductive seal material 152 and be soldered to electrical clips or directly to a circuit board through which power is supplied to the electrochromic mirror. To coat the wire and deposit it between substrates 112 and 114, wire 150 may be fed through the middle of a dispensing nozzle that is used to dispense seal material 152 directly onto the required portion of coated element 114.

Figure 8C:
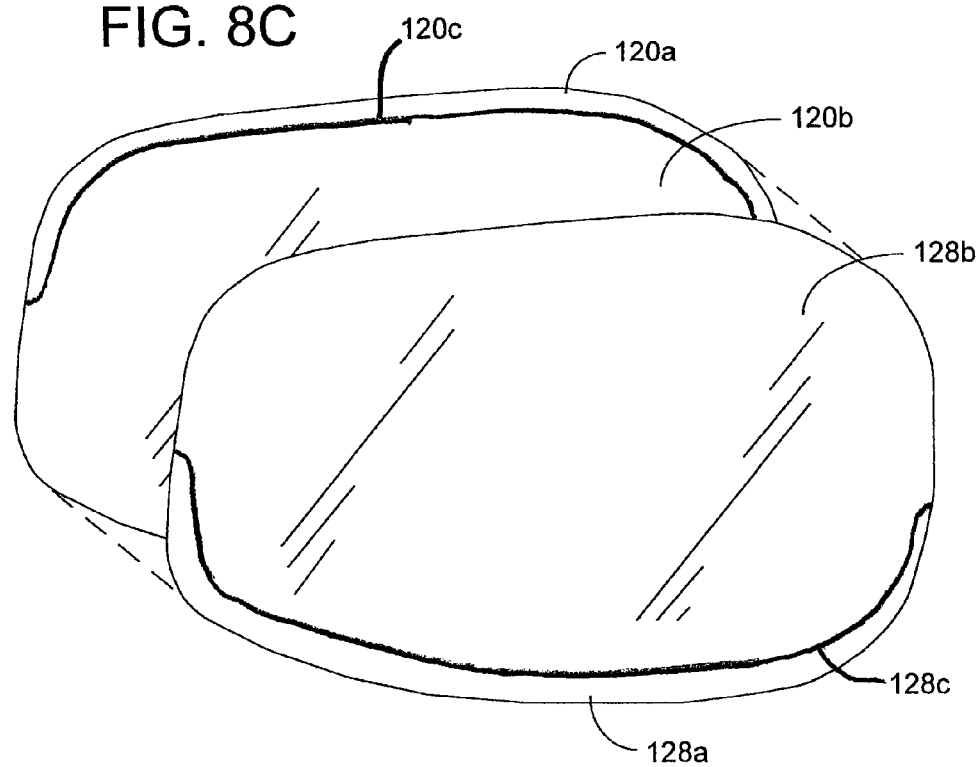
FIG. 8C is an exploded view showing the front and rear substrates having electrodes formed thereon, as may be used in the electrochromic mirror elements of the present invention.
Figure 8D:
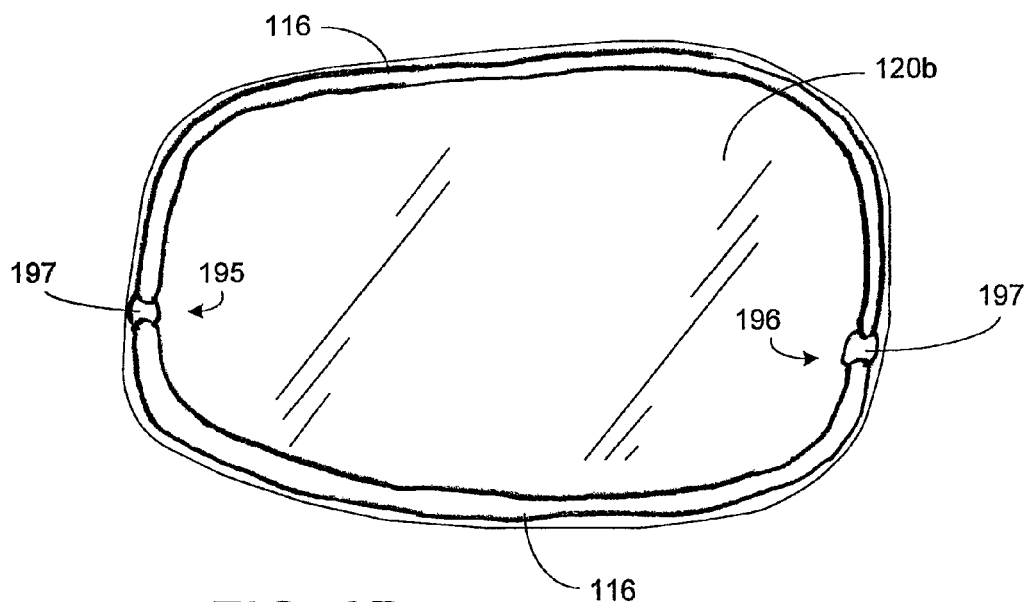
FIG. 8D is a top plan view of the rear substrate shown in FIG. 8A and additionally having a seal formed thereon.

FIGS. 8C and 8D illustrate another implementation of the first embodiment of the present invention. Specifically, FIG. 8C illustrates the electrode etching of both electrodes 120 and 128, while FIG. 8D shows the provision of the seal 116 where an outer portion of its width is conductive and the inner portion is nonconductive similar to the seal shown in FIG. 3. The entire seal 116 could be conductive and the electrochromic device would function, however, this construction is not preferred with solution phase devices because of the segregation of the electrochromic species is enhanced when coloration of the electrochromic media occurs on the inside edge of the conductive seal and exposed portion of electrodes 128a and 120a. As shown in FIG. 8D, there are two fill ports 195 and 196 provided at opposite ends of the electrochromic device, which provide for electrical isolation of the conductive portions 116b of seals 116. The plug material 197 used to plug fill ports 195 and 196 would also be made of an electrically nonconductive material to provide for the necessary electrical isolation.

Figure 9:
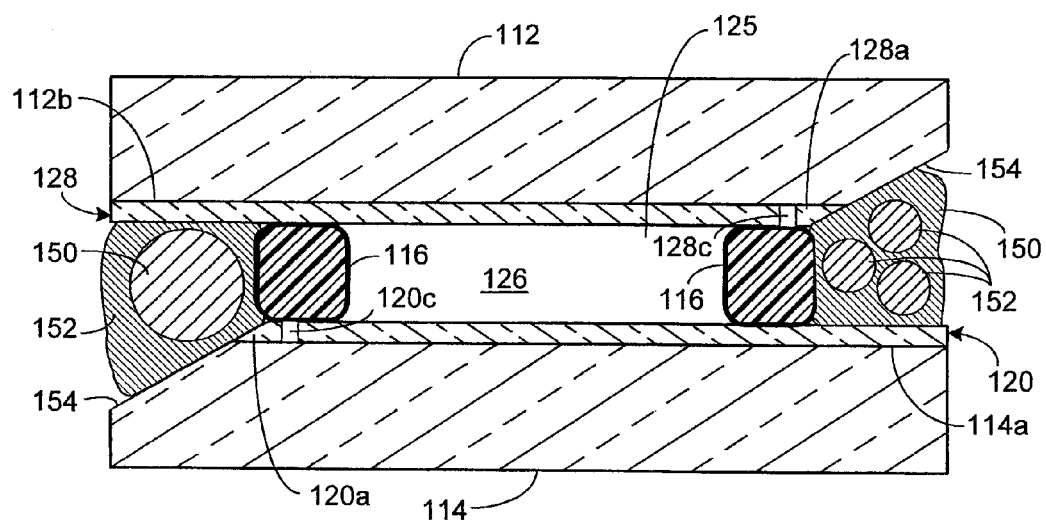
FIG. 9 is an enlarged cross-sectional view of an electrochromic mirror element incorporating aspects of a third embodiment of the present invention.

FIG. 9 shows two variations of the embodiment shown in FIG. 6. With reference to the left side of the device shown in FIG. 9, it may be seen that at least one portion of the peripheral edge of the front surface 114a of element 114 may be beveled to provide a heavy seam 154 between elements 112 and 114. By providing this larger seam 154, a larger diameter wire 150 may be inserted between elements 112 and 114, without otherwise having to increase the spacing between elements 112 and 114, particularly within the chamber 125. Such a seam 154 may be provided by beveling either the front surface 114a of element 114 or the rear surface 112b of front element 112. As an alternative, rather than providing a single large diameter wire 150, a plurality of wires 150 or wire strands of a braided wire may be provided as the electrical conductor between portions of the electrodes 120 and 128. By providing wires twisted together, adhesive 152 is easier to apply and the wires need not be made of the same material. For instance a copper wire could be twisted with a stainless steel, nylon, KEVLAR, or carbon fiber or wire to impart strength or other desirable properties. The seam 154 could extend, for example, 0.020 inch in from the side edges of elements 112 and 114. Although the seam could extend far enough into the device such that nonconductive seal 116 would cover the beveled portion of electrode 120b, it still would be beneficial to laser etch region 120c to ensure there is no electrical shorting. It should be noted that if conductive adhesive 152 were of sufficient conductivity, wire 150 would not be necessary. In this case, seam or bezel 154 would enable more conductive material 152 to be used which would improve the overall conductivity of the contact area.

Figure 10:
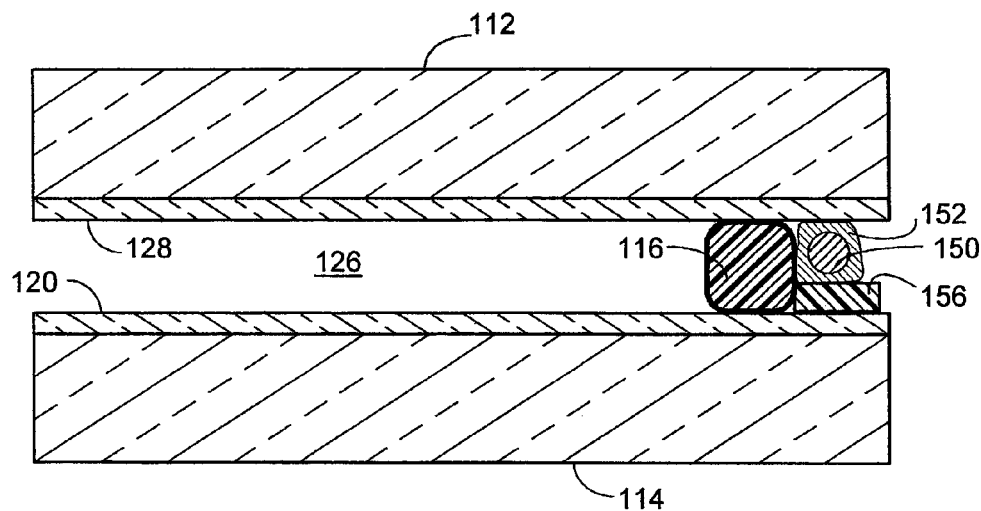
FIG. 10 is an enlarged cross-sectional view of an electrochromic mirror element incorporating aspects of a fourth embodiment of the present invention.

FIG. 10 illustrates yet another embodiment of the present invention. This embodiment is also similar to that shown in FIG. 6, except that, rather than etching a portion of electrode 120 to provide separate regions, an electrically nonconductive coating or material 156 is provided between electrode 120 and the coated wire 150. Coating or material 156 could be formed of a thin layer of organic resin such as epoxy, polyester, polyamide, or acrylic, or of inorganic material such as $SiO_2$, $Ta_2O_5$, etc. Such a nonconductive material may also help to hold the wire in place.

Figure 11:
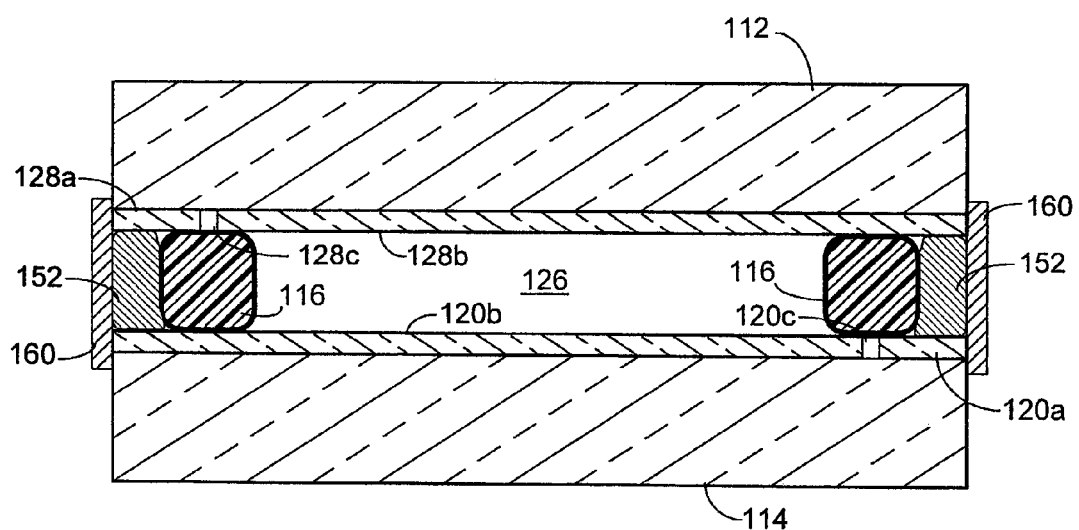
FIG. 11 is an enlarged cross-sectional view of an electrochromic mirror element incorporating aspects of a fifth embodiment of the present invention.

FIG. 11 shows another embodiment of the present invention. As shown, not only is the rear electrode 120 etched along one side edge, but also the transparent front electrode 128 is etched to form a first portion 128a and a second portion 128b separated by an area 128c devoid of conductive material (see, for example, FIG. 8C). The front transparent electrode 128 may be etched along any side other than that on which electrode 120 is etched. An electrically nonconductive seal 120 would thus be formed about the periphery and over the etched portions 128c and 120c of the two electrodes. The edges of elements 112 and 114 would be even with one another. The epoxy seal 116 would preferably be dispensed in from the edges of elements 112 and 114 approximately 0.010 to 0.015 inch on the top and bottom and even with the glass edges on the sides. Conductive material 152 could then be dispensed into the 0.010-0.015 inch channel at the top and bottom of the device. A foil, copper webbing material, or other highly conductive material 160 could then be adhered to the conductive epoxy/adhesive for each of the top and bottom regions to provide electrical contact to electrodes 120 and 128. The webbing with its high surface area or a foil or thin conductive material with holes in, or roughened up exterior, enhance the adhesion of a such a material to the conductive material 152 and to the edges of the device.

Figure 12:
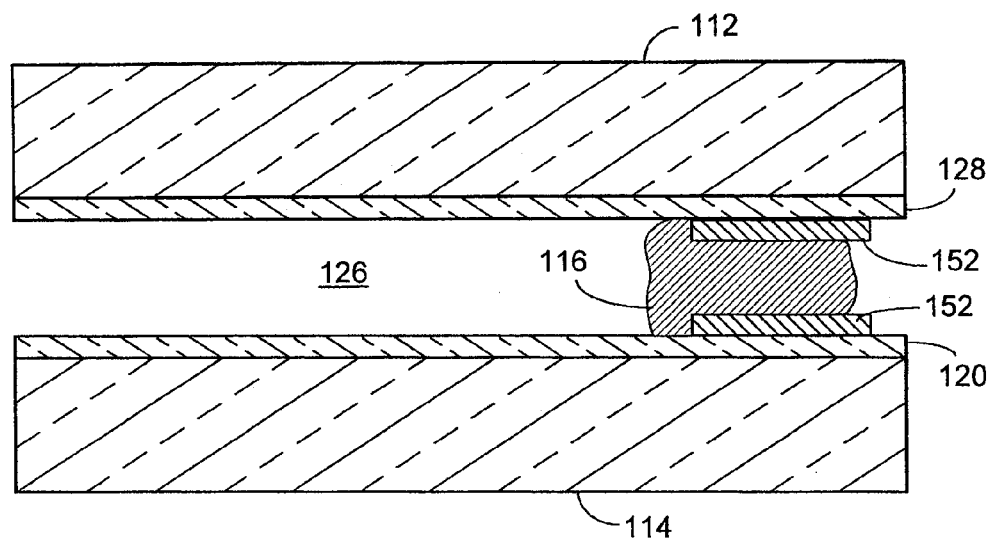
FIG. 12 is an enlarged cross-sectional view of an electrochromic mirror element incorporating aspects of a sixth embodiment of the present invention.

FIG. 12 shows another embodiment of the present invention. This embodiment, which would apply to both electrochromic mirror and window applications, includes a conductive seal material 152, which is deposited and cured on each of electrodes 120 and 128. An electrically nonconductive seal 116 is then dispensed between conductive seals 152 and would be dispensed inward so as to provide electrical isolation, if desired, from electrochromic medium 126. Alternatively a dual dispense could be used for simultaneously dispensing the conductive and non-conductive seal materials. Thus, a portion of the seal height is used as both the seal and the electrically conductive buss. An advantage of this construction is that the seal/conductive buss 152 may extend about the entire periphery of the electrochromic device for each of the two electrodes 120 and 128. Preferably, conductive seal material 152 would be formed of epoxy loaded with silver.

Figure 13:
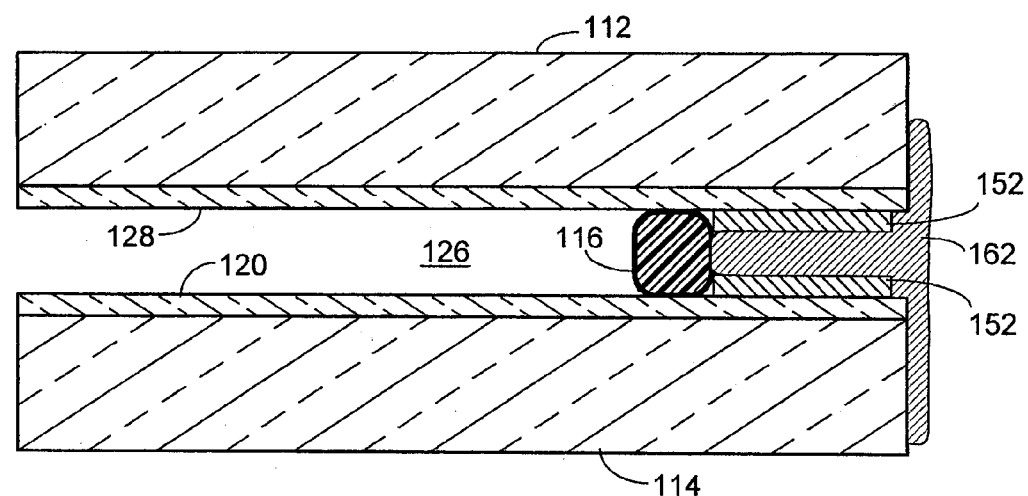
FIG. 13 is an enlarged cross-sectional view of an electrochromic mirror element incorporating aspects of a seventh embodiment of the present invention.

FIG. 13 shows a slight variant to the embodiment depicted in FIG. 12. Specifically, if the conductive material added to the epoxy seal portions 152 is less environmentally friendly than silver, the nonconductive seal could be formed either in two stages or using two separate nonconductive seal materials. For example, the nonconductive epoxy seal 116 could be provided in the conventional manner between the electrochromic medium 126 and conductive seals 152. Subsequently, a nonconductive material 162 could be used to fill the gap between conductive seal portions 152 and could extend along the edge of glass elements 112 and 114. A benefit of using this process is that seal material 116 may be selected from those materials that are least susceptible to degradation from the electrochromic medium while seal material 162 could be selected from materials that are perhaps more moisture and oxygen impermeable.

Figure 14:
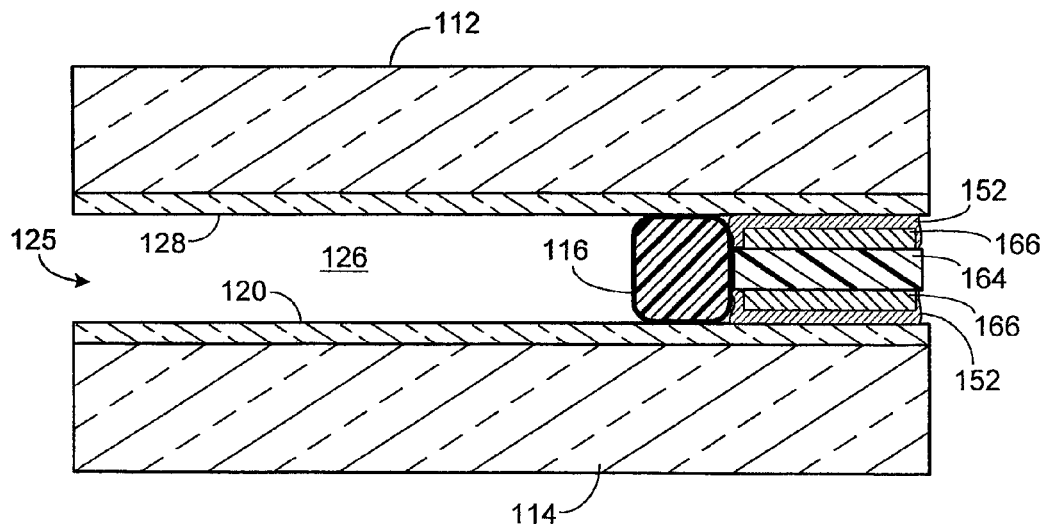
FIG. 14 is an enlarged cross-sectional view of an electrochromic mirror element incorporating aspects of an eighth embodiment of the present invention.

FIG. 14 shows yet another embodiment of the present invention. This embodiment, which would be equally suitable for mirrors or windows, provides for a nonconductive seal 116 between electrodes 128 and 120 while defining the outer bounds of the chamber 125 in which electrochromic medium 126 is disposed. Between seal 116 and the edge of elements 112 and 114 is provided an electrically insulative material 164 made of ethylene-propylenediene monomer (EPDM), polyester, polyamide, or other insulating material, and having conductive materials 166 such as a foil or copper web or other highly conductive material attached to opposite sides thereof. Conductors 166 may be secured to opposite sides of insulator 164 using a PSA. A conductive ink or epoxy 152 could be used to increase the contact stability between conductors 166 and electrodes 128 and 120. Seal 116 is not necessary if materials 152, 166, 164 provide adequate environmental protection and do not interfere with the electrochromic medium.

Figure 15:
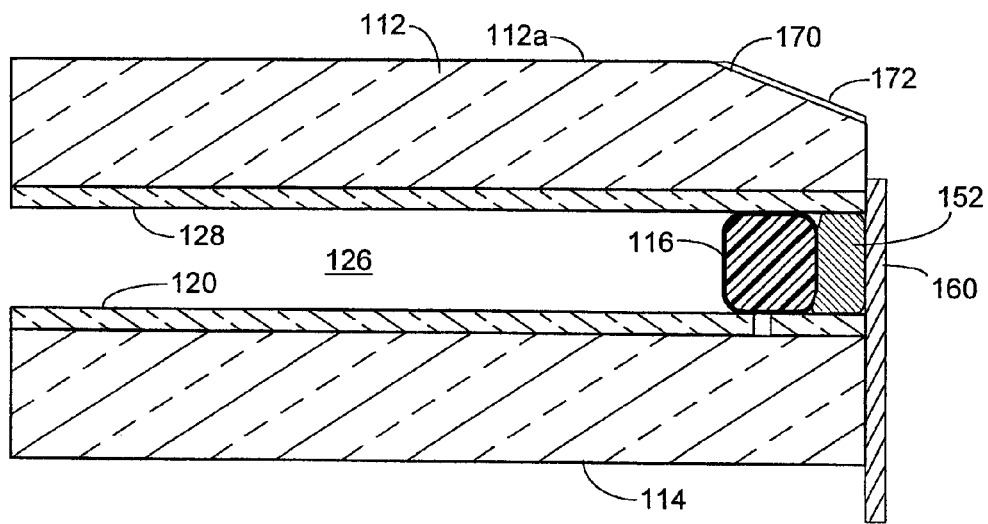
FIG. 15 is an enlarged cross-sectional view of an electrochromic mirror element incorporating aspects of a ninth embodiment of the present invention.

FIG. 15 shows an enhancement to the embodiment described above with respect to FIG. 11. It will be appreciated, however, that this enhancement may be used with any of the other embodiments described above or below. Specifically, the structure is modified such that the front surface 112a of front element 112 is beveled around its peripheral surface to provide beveled peripheral edge surface 170 that is of sufficient width to obscure the view of seal 116/152. With such a design, it may be possible to eliminate the bezel in its entirety. As will be appreciated by those skilled in the art, conductive foil or web 160 may extend rearward and wrap around for electrical contact to a printed circuit board or the heater circuit through which power may be supplied to selectively vary the reflectivity of the mirror element. To further mask the view of the seal, a reflective coating 172 may be applied to beveled surface 170.

Figure 16:
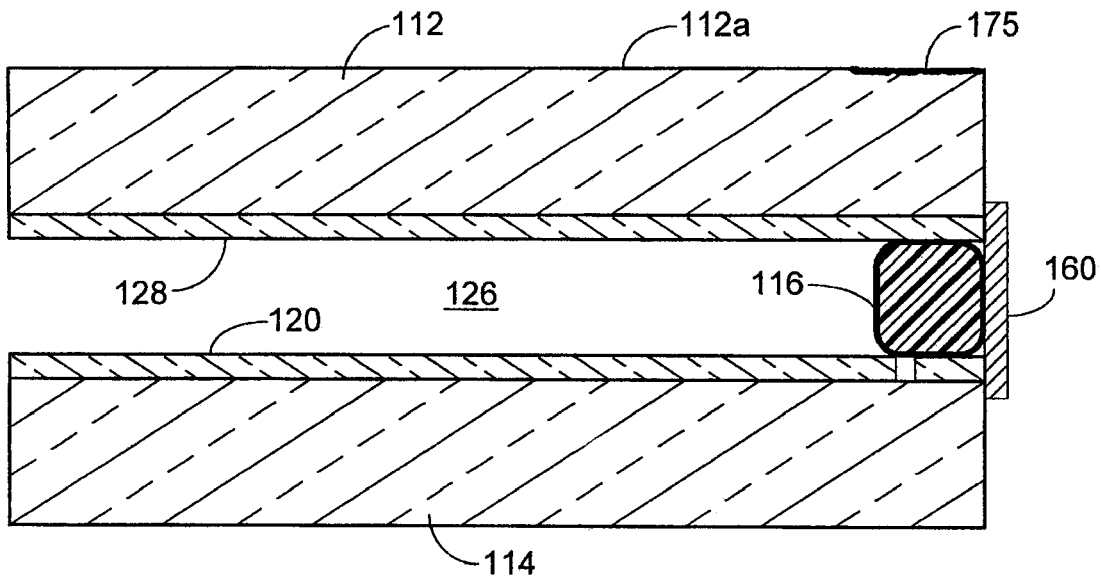
FIG. 16 is an enlarged cross-sectional view of an electrochromic mirror element incorporating aspects of a tenth embodiment of the present invention.
Figure 17A:
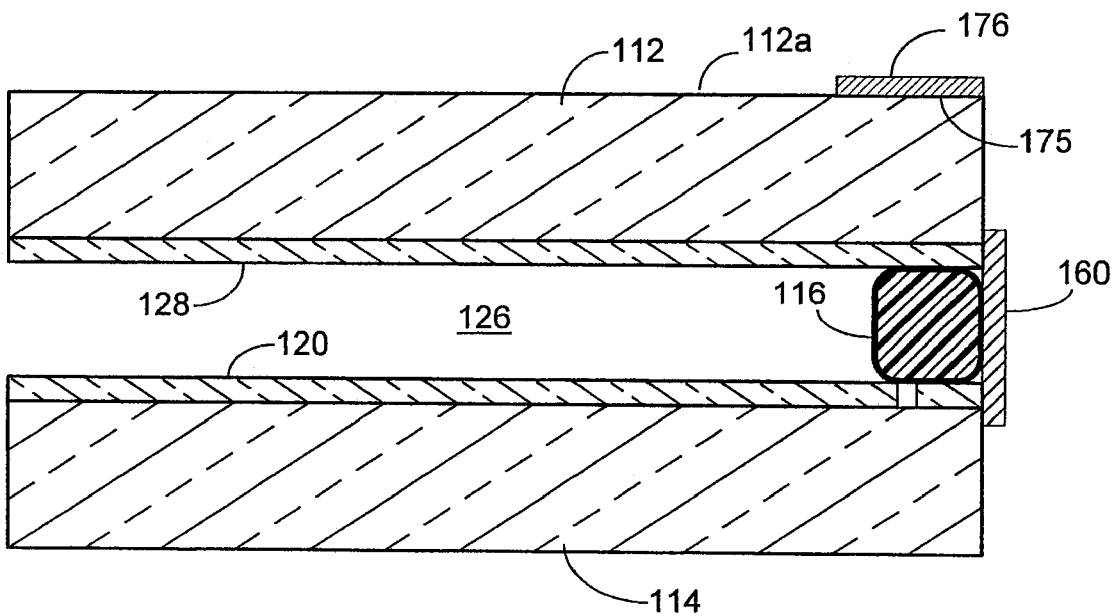
FIG. 17A is an enlarged cross-sectional view of an electrochromic mirror element incorporating aspects of an eleventh embodiment of the present invention.
Figure 17B:
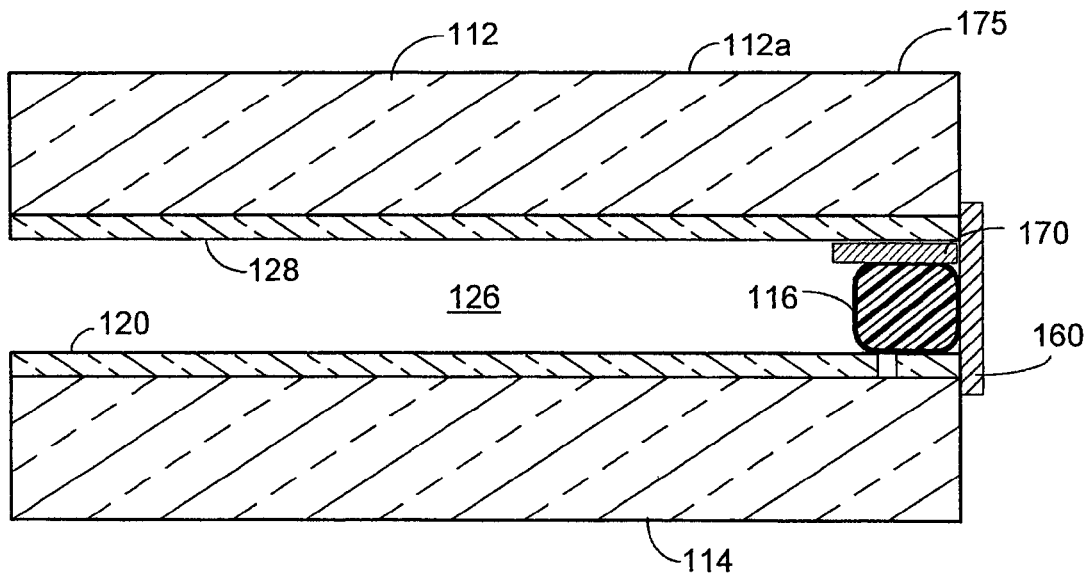
FIG. 17B is an enlarged cross-sectional view of an electrochromic mirror element incorporating aspects of a twelfth embodiment of the present invention.

FIG. 16 shows a slightly different approach for obscuring the view of seal 116. Specifically, the peripheral portion 175 of front surface 112a of front element 112 is sandblasted, roughened, or modified to obscure the view of the portion of the device where the seal could otherwise be seen. Yet another approach is shown in FIG. 17A where a reflective or opaque paint/coating 176 is provided on the peripheral region 175 of the front surface 112a of front element 112. As shown in FIG. 17B, such a reflective or opaque coating, paint, or film could be provided on the rear surface 112b of front element 112.

Yet another way to conceal the seal is to use a seal material that is transparent as disclosed in commonly assigned U.S. Pat. No. 5,790,298, the entire disclosure of which is incorporated herein by reference.

Each of the different methods for obscuring the view of the seal described above in connection with FIGS. 15-17B may be combined or used separately, and may be used with any of the other embodiments described herein. For example, the beveled surface 170 shown in FIG. 15 could be sandblasted. Likewise, the sandblasted portion 175 of surface 112a could be painted or coated with a reflective or high refractive index material. Paint or other material could be applied by silk-screening or other suitable methods. The reflective material in combination with the roughened surface provides a diffuse reflector.

Figure 18:
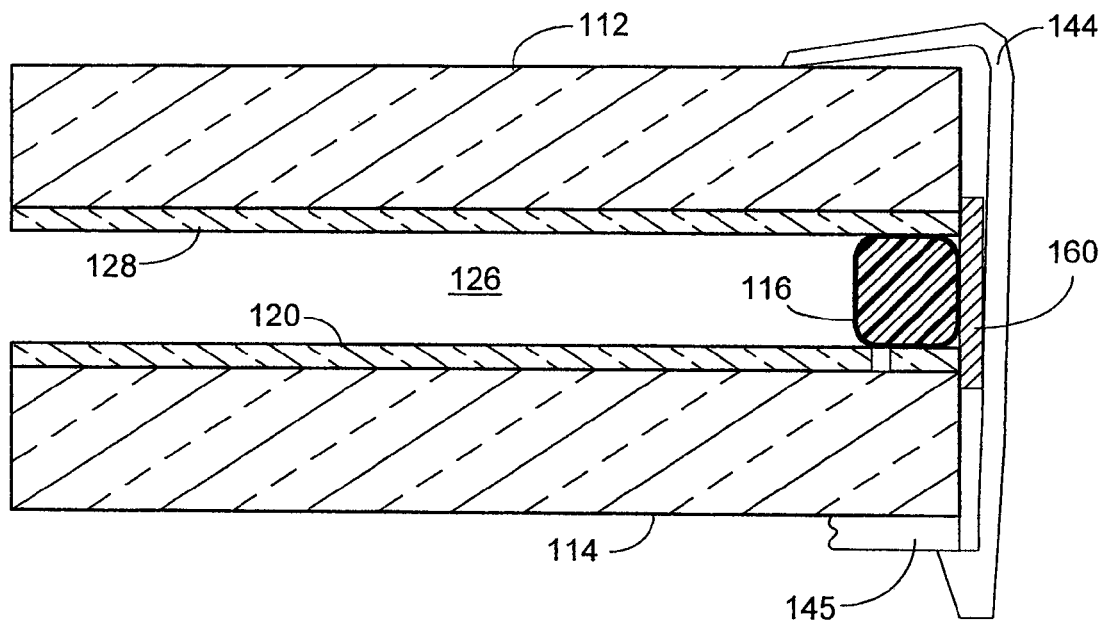
FIG. 18 is an enlarged cross-sectional view of an electrochromic mirror element incorporating aspects of a thirteenth embodiment of the present invention.

As mentioned above, other techniques may be used for improving the styling and appearance of the bezel. FIG. 18, for example, illustrates the use of a bezel 144, which has at least a surface thereof made of a metal, such as chrome or chrome-plated plastic or other material. Thus, at least a portion of the front surface of the bezel 144 would not have a black color, but rather would be reflective similar to the appearance of the mirror itself and thus be difficult to distinguish from the remainder of the mirror subassembly. Bezel 144 may engage a carrier plate 145 in any conventional manner.

Figure 19:
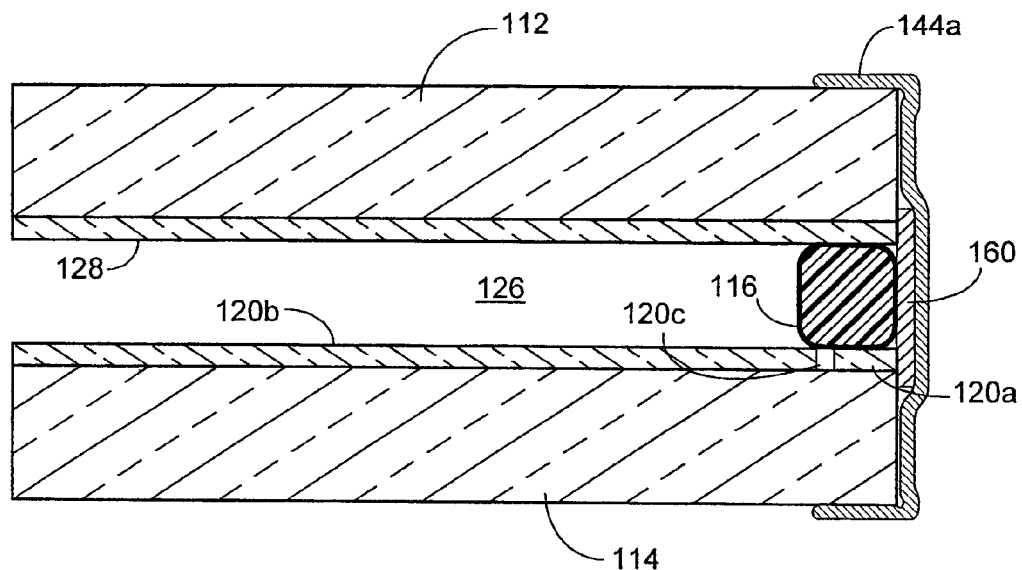
FIG. 19 is an enlarged cross-sectional view of an electrochromic mirror element incorporating aspects of a fourteenth embodiment of the present invention.

Another reason why the bezels typically are fairly wide is to accommodate the difference in the coefficient of thermal expansion of the material from which the bezel is made relative to the materials used to form the electrochromic element. Conventional bezels are made out of strong and fairly rigid engineering plastics such as polypropylene, ABS/PC, ASA, and have thermal expansion coefficients that are much larger than glass mirrors. This expansion difference can create tremendous hoop stress as the strong rigid bezel shrinks around the mirror at cold temperatures. As a result, conventional bezels may have ribs or defined voids for accommodating the thermal expansion difference between the element and rigid bezel. A solution in this regard is illustrated in FIG. 19 in which the bezel 144a is formed of an elastomeric material which stretches and contracts with the thermal expansion/contraction of the electrochromic element.

The elastomeric material could be injected or resin transfer molded directly around the mirror element such as with injection molded PVC or polyurethane Reactive Injection Molding (RIM). The elastomeric bezel could be injection molded separately out of elastomeric materials known as Thermoplastic Elastomers (TPE) such as thermoplastic polyurethane (TPU), thermal plastic polyolefin (TPO, TPV), Styrenic Thermoplastic Elastomer (TPS), Polyester Thermoplastic Elastomer (TPC), Nylon or Polyamide Thermoplastic Elastomer (TPA) or a vulcanized or polymerized rubber, polyurethane, silicone or fluoroelastomer and then applied to the mirror element. One approach would be to injection mold the elastomeric bezel in a "C" or "U" shape that is the mirror shape and size or preferably that is slightly smaller than the mirror shape and size and then stretch and "snap" the bezel onto the mirror. Bezels made in such a fashion fit snugly on the mirror and survive thermal shock and thermal cycling very well. One benefit of "C" or "U" shaped bezels is if they are made symmetrical from front to back, a bezel that is made for the drivers side of the vehicle, if rotated 180 degrees, will generally also fit the passenger side of the vehicle because the two mirrors are usually mirror images of one another. Since the bezels are flexible, another benefit is that a bezel made for a flat mirror will also conform to a convex or aspheric mirror shape. Only one bezel needs to be tooled to fit the left and right side flat, convex and aspheric mirrors resulting in major cost, time and inventory savings. It may be desirable to fix or fasten the bezel to the mirror or mirror back with adhesive or mechanically to avoid the bezel dislodging from the mirror if the mirror is scraped with an ice scraper. The adhesive could be a single component system such as a moisture cure silicone or urethane that is applied either around the edge on the glass or inside the "C" or "U" shaped bezel or both. The bezel could then be applied and the adhesive would cure with time. A two component or solvent-based adhesive could also be used in this manner. A hot melt adhesive could also be applied to the perimeter of the mirror or inside the "C" or "U" of the bezel or both. The bezel could then be applied to the mirror while the adhesive was still hot or the bezel/mirror assembly could be re-heated to melt the hot melt and bond the bezel to the mirror. A mechanical means to trap or engage the elastomeric bezel in place could also be used. The bezel could be made with holes or grooves in the back or side to engage with a more rigid back member. The elastomeric bezel could also be co-injected with a more rigid material that would form an elastomeric portion around the perimeter and a more rigid section around the back of the mirror to hold the elastomeric section in place. This rigid section could cover most of the back of the mirror and engage with the power pack or adjustable mirror support that holds the mirror in place in the mirror housing shell. The mirror in this arrangement could be attached to the rigid back portion with adhesive or double sided adhesive tape. The rigid portion could also only cover the perimeter of the mirror back and attach to a carrier that engages with the power pack or adjustable mirror support. In any case, the rigid portion of the mirror back would mechanically hold the elastomeric portion of the mirror back and bezel in place. An adhesive could also be used to bond the elastomeric portion of the bezel or mirror back to the more rigid portion of the mirror back to hold it in place.

Figure 20:
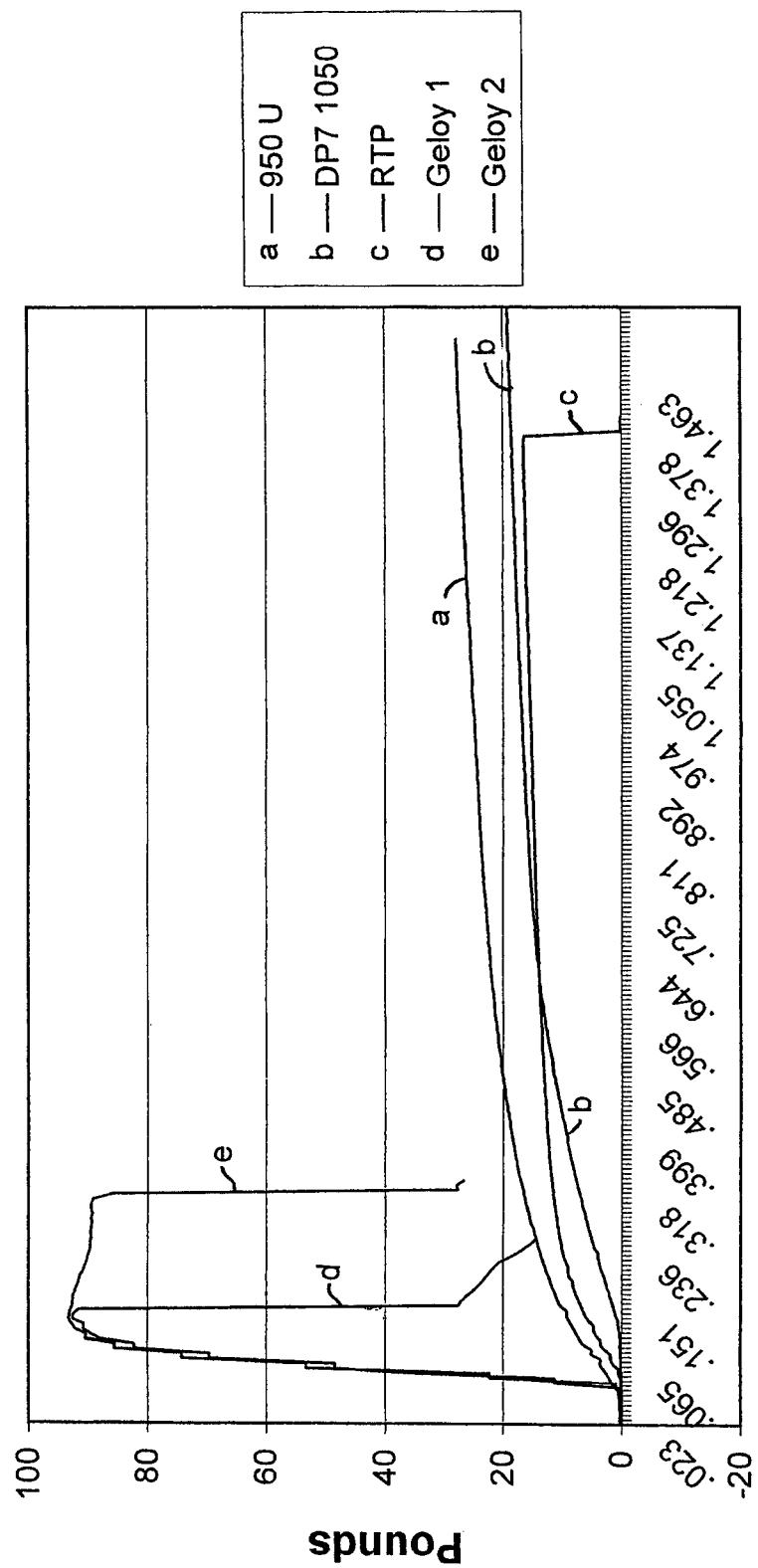
FIG. 20 is a plot of bezel force vs. deflection for various materials that may be used to construct the bezel according to the fourteenth embodiment of the present invention.

The plots of Force vs. Displacement shown in FIG. 20 are for short sections cut from a typical bezel made from different materials. The short sections were fixtured in a Chatillon (Greensboro, N.C.) device and pulled. The force vs. displacement plots show that with rigid materials typically used to make prior art bezels (Geloy, ASA/PC) the force increases rapidly with a small change in displacement when compared to bezels made from elastomers or rubbers (950 U, DP7 1050, RPT). Consequently, bezels made of these elastomeric materials that snugly fit the glass mirror at room temperature do not generate high values of hoop stress as the bezel contracts around the glass at low temperatures. By contrast, a bezel made of a rigid material like ASA/PC that fit snugly at room temperature would generate high values of hoop stress as the bezel contracts around the glass at low temperatures. The elastomeric bezel 144a is preferably disposed around the periphery of at least the front element 112. Due to its elastic nature, the elastomeric bezel has a smaller perimeter than that of at least the front element so that the elastomeric bezel fits snugly around the mirror element.

Some of the physical properties of rigid and elastomeric bezel materials are shown below in Table 1. The tensile modulus of some prior art rigid plastic material range for a low of 72,000 psi to a high of just over 350,000 psi. By contrast, the preferred elastomeric bezel materials have a tensile modulus of from about 100 psi to 3,000 psi. Thus, the inventive elastomeric bezel materials have a tensile modulus of less than about 72,000 psi, and may have a tensile modulus less than about 3,000 psi. The lower the tensile modulus of the bezel material, the lower the hoop stress value will be in the thermal coefficient mismatched system of a glass mirror surrounded by a plastic bezel.

Figure 22:
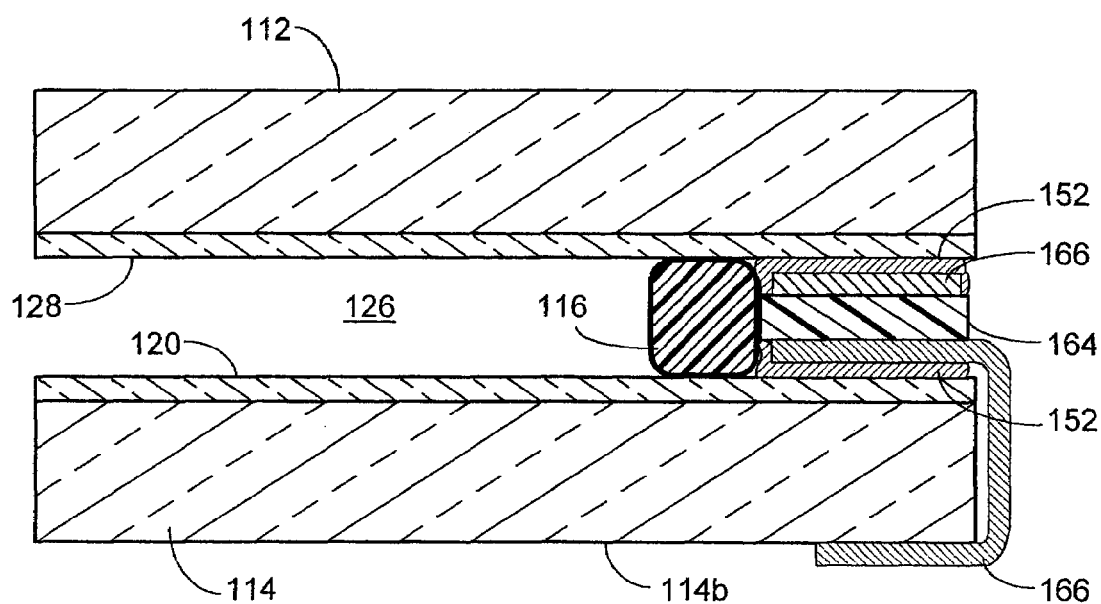
FIG. 22 is an enlarged cross-sectional view of an electrochromic mirror element incorporating aspects of a nineteenth embodiment of the present invention.

FIG. 22 shows a variation of the embodiment shown in FIG. 14 and described above. The structure shown in FIG. 22 differs in that one of the layers of conductive foil or web 166 extends outward beyond the edges of elements 112 and 114 and wraps around element 114 for connection to either a printed circuit board or a heater circuit. Additionally, the rear surface 114b of rear element 114 may be patterned with conductive electrodes for supplying power to foil 166. The foil 166 on the opposite side of insulator 164 may likewise extend outward for connection to the other of electrodes 128 and 120. Foil 166 may be cut using pinking shears and effec-

TABLE 1

| polymer | Tensile Modulus (100% Secant) psi | Tensile Elongation, break (%) | Tensile Elongation, yield (%) | Tensile Strength, yield (psi) | Glass Transition Temperature (° F.) | Shore Hardness (R = Rockwell R) |
|---|---|---|---|---|---|---|
| Bayer T84 PC/ABS | 336000 | 75 | 4 | 8000 | N/A | 119R |
| GE LG9000 PC/ABS | 352000 | 75 | N/A | 7900 | N/A | 118R |
| GE Geloy PC/ASA | 324000 | 25 | 4-5** | 8600 | N/A | 114R |
| Huntsman AP 6112-HS PP | 72500-1100000 | 120* | 6 | 3550 | N/A | 98R |
| Bayer Makrolon 3258 PC | 348000 | 125 | 6 | 9100 | N/A | ~115R*** |
| Texin DP7-1050 polyether | 1100 (100%) | 450 | N/A | 5000 | −47 | 90A |
| Texin 950 U polyether | 2000 (100%) | 400 | N/A | 6000 | −17 | 50D (~93A) |
| Multibase Inc. Multi-Flex A 3810 TPE | 170 (100%) | N/A | 700 | 725 | N/A | 45A |
| Multibase Inc. Multi-Flex A 4001 LC TPE | 120 (100%) | 600 | N/A | 800 | N/A | 33A |
| Multibase Inc. Multi-Flex A 4710 S TPE | 175 (100%) | 700 | N/A | 750 | N/A | 49A |
| DSM Sarlink 4139D TPE | 1550 (100%) | 588 | N/A | 2340 | N/A | 39D (~88A) |

Figure 21A:
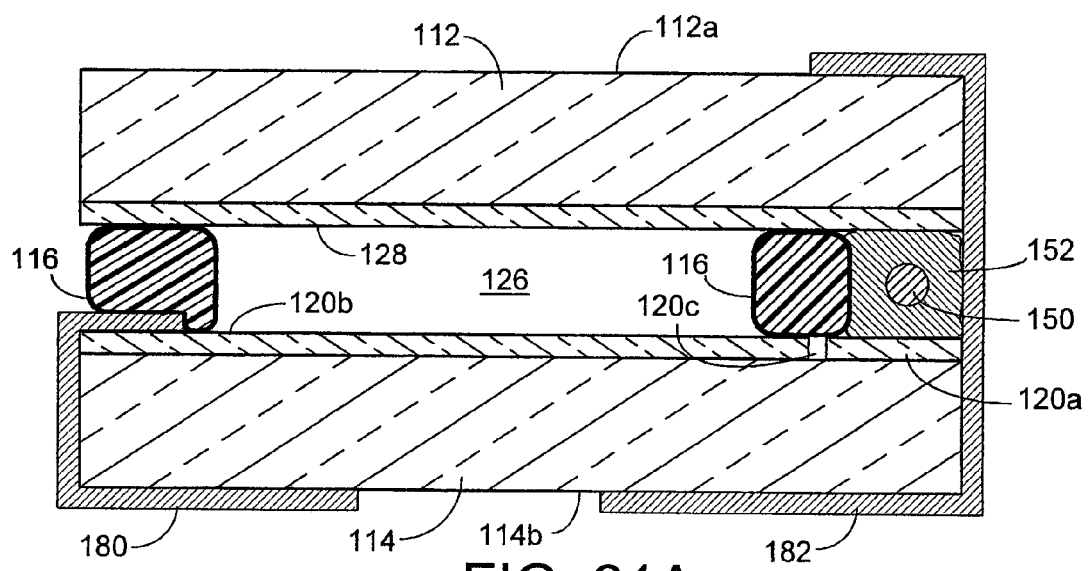
FIG. 21A is an enlarged cross-sectional view of an electrochromic mirror element incorporating aspects of a fifteenth embodiment of the present invention.
Figure 21B:
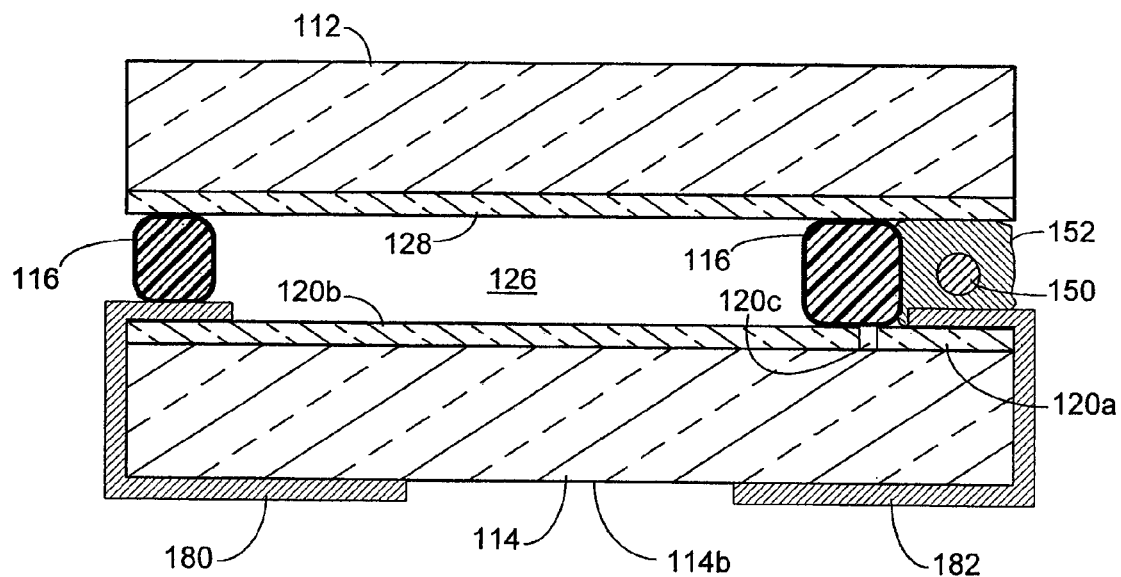
FIG. 21B is an enlarged cross-sectional view of an electrochromic mirror element incorporating aspects of a sixteenth embodiment of the present invention.
Figure 21C:
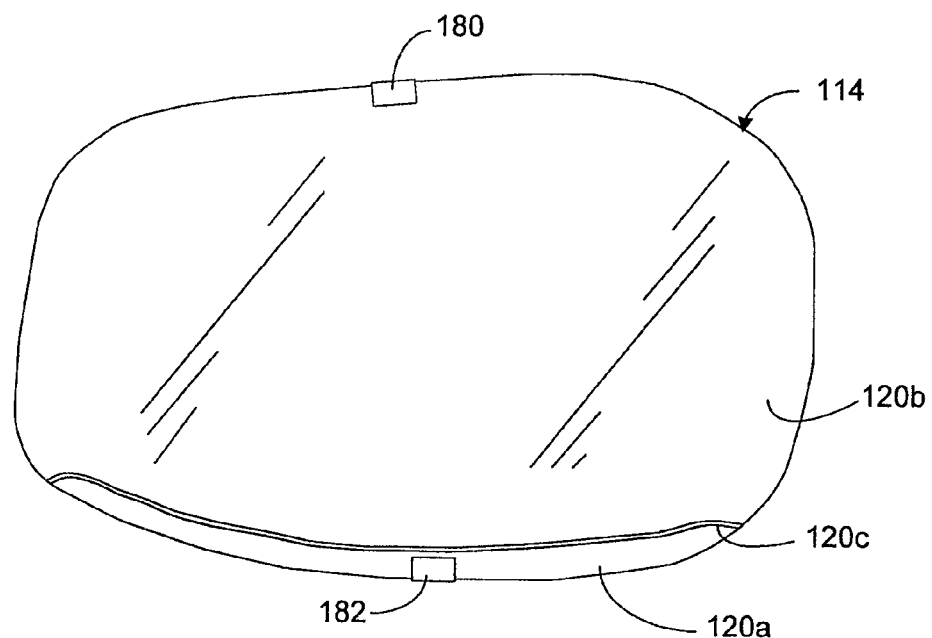
FIG. 21C is a top plan view of a rear substrate having an electrode formed thereon, as may be used in the electrochromic mirror element shown in FIG. 21B.
Figure 21D:
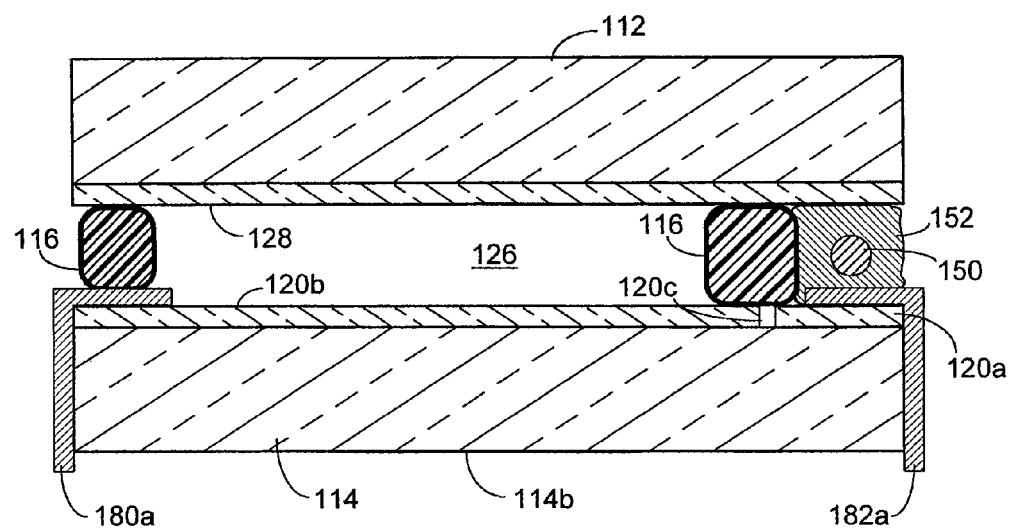
FIG. 21D is an enlarged cross-sectional view of an electrochromic mirror element incorporating an edge seal in accordance with a seventeenth embodiment of the present invention.
Figure 21E:
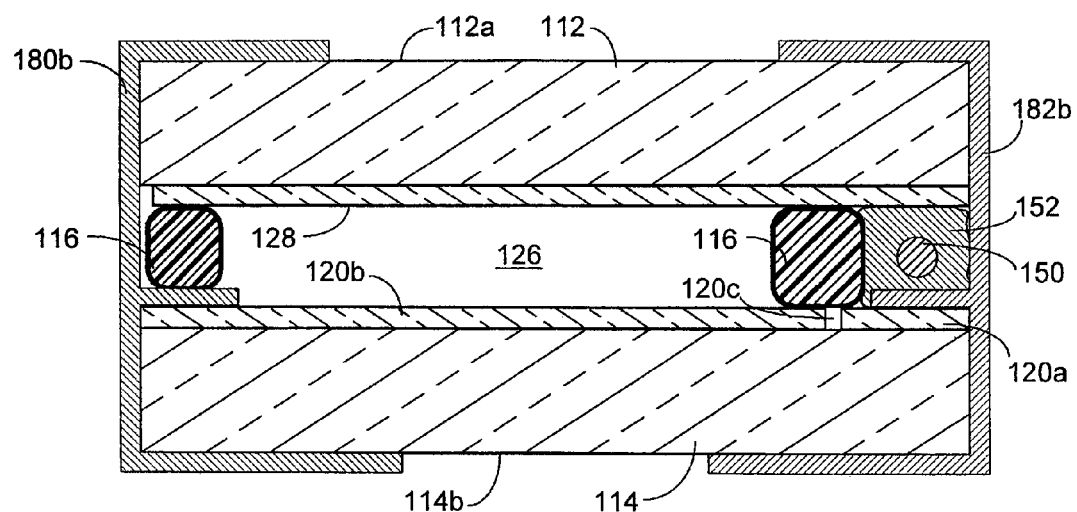
FIG. 21E is an enlarged cross-sectional view of an electrochromic mirror element incorporating an edge seal in accordance with an eighteenth embodiment of the present invention.

*Value taken from "Machinery's Handbook 25"
**Data taken from www.matweb.com
***Data taken from Hardness Comparison Chart FIG. 21A illustrates one technique for providing for electrical coupling to an electrochromic device such as that of the first embodiment. As shown, a first electrically conductive clip 180 is clipped to element 114 so as to be in electrical contact with second portion 120b of electrode 120. A second electrically conductive clip 182 is provided that clips around the entire device and thus contacts front surface 112a of front element 112 and rear surface 114b of rear element 114. Electrical contact is made to electrode 128 via first portion 120a of electrode 120, and via electrically conductive material 152. A variation of this construction is shown in FIG. 21B in which 182 is made of an identical construction as that of clip 180 so as to clip only to rear element 114. Again, electrical coupling between clip 182 and electrode 128 is through electrically conductive seal 152 and any wire 150 that may be disposed therein. As shown in FIG. 21C, one or a plurality of such clips may be provided for electrical connection to each electrode 120 or 128. Clips 180 and 182 may be directly soldered or otherwise connected to a circuit board or wires extending therebetween may be soldered to clips 180 and 182. FIGS. 21D and 21E show two additional variants of the clips 180 and 182 discussed above. In FIG. 21D, clips 180a and 182a are modified such that they do not extend around rear surface 114b of rear element 114. In FIG. 21E, clips 180b and 182b are modified so as to extend over and around front surface 112a of front element 112 while also extending around rear surface 114b of rear element 114. As will be apparent to those skilled in the art, various modifications can be made to the disclosed clip designs without departing from the scope of the present invention.

tively bent to form one or more connector clips. Foil 166 may be configured as an electrical buss with tabs extending into the seal.

Figure 23:
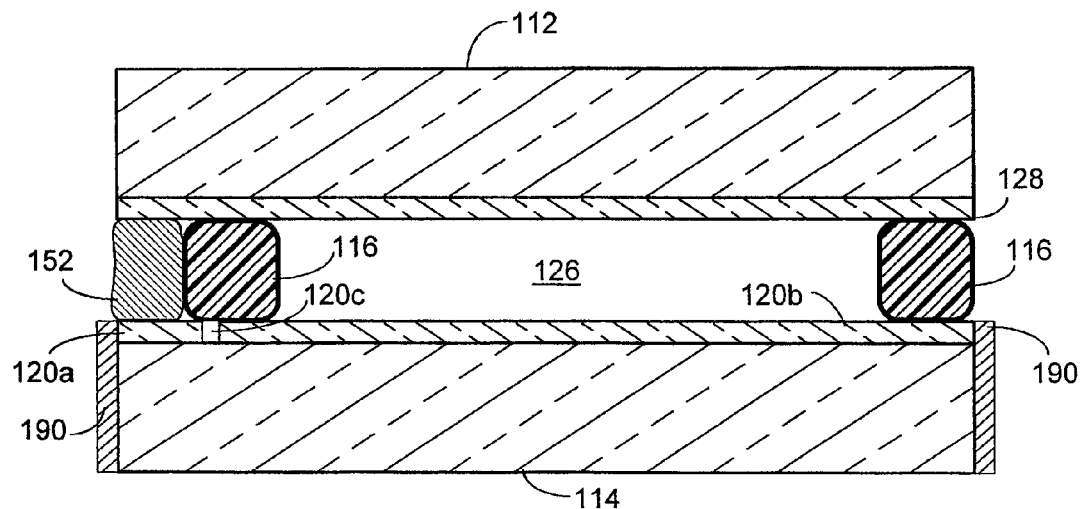
FIG. 23 is an enlarged cross-sectional view of an electrochromic mirror element incorporating aspects of a twentieth embodiment of the present invention.

FIG. 23 shows yet another embodiment in which a conductive coating 190 is deposited on the peripheral edge of rear element 114. Such a coating may be made of metal and applied with solder. Alternatively, the material may be rolled onto the edge of element 114. Such a construction allows contact merely to the edges of element 114 to provide electrical coupling to one or both of electrodes 120 and 128.

Figure 24:
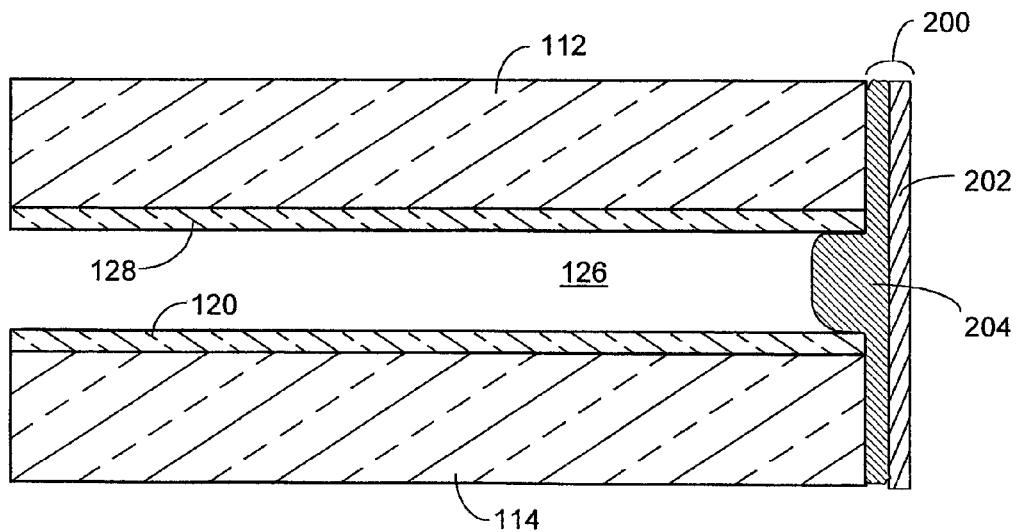
FIG. 24 is an enlarged cross-sectional view of an electrochromic mirror element incorporating an edge seal in accordance with a twenty first embodiment of the present invention.

Yet another embodiment is shown in FIG. 24. In this embodiment, the majority of the sealing member is moved from between the front and rear elements 112 and 114 to the edge of the front and rear elements. Thus, the seal is provided predominately on the peripheral edges of the front and rear elements. As shown in FIG. 24, the seal 200 contacts the front element 112 both on the peripheral edge and the rear surface of the front element. Likewise, the seal 200 contacts the rear element 114 both on the peripheral edge and the front surface of the rear element. A first contact area in which seal 200 contacts the peripheral edge of front element 112 is larger than a second contact area in which seal 200 contacts the rear surface of front element 112. Likewise, a third contact area in which seal 200 contacts the peripheral edge of rear element 114 is larger than a fourth contact area in which seal 200 contacts the front surface of rear element 114. As a result, an interface between seal 200 and front element 112 defines an oxygen penetration path length through which oxygen would have to travel to enter chamber 126, wherein the portion of the path length extending along the peripheral edge of front element 112 is longer than the portion of the path length extending along the rear surface of front element 112. Similarly, an interface between seal 200 and rear element 114 defines another oxygen penetration path length through which oxygen would have to travel to enter chamber 126 wherein the portion of this path length extending along the peripheral edge of rear element 114 is longer than the portion of the path length extending along the front surface of rear element 114. By forming seal 200 of a thin member 202 of a first material having an oxygen permeability of less than 2.0 $cm^3 \cdot mm/m^2 \cdot day \cdot atm$ and/or by increasing the oxygen penetration path length as compared to other electrochromic cells, the amount of oxygen penetration into chamber 126 may be significantly reduced. Typical prior art seals are made of epoxy resins, which have oxygen permeabilities of 2.0-3.9 $cm^3 \cdot mm/m^2 \cdot day \cdot atm$ and water permeabilities of 0.7-0.94 $gm \cdot mm/m^2 \cdot day$, and are predominately positioned between the front and rear elements thereby having a shorter oxygen penetration path length.

First material forming thin member 202 may be made of a material selected from the group of: metal, metal alloy, plastic, glass, and combinations thereof. First material 200 is adhered to the peripheral edges of the front and rear elements with a second material 204. The second material may have a higher oxygen permeability than said first material, and may be an electrically conductive adhesive or an electrically conductive epoxy that makes electrical contact with at least one of first and second electrically conductive layers 120 and 128.

In the preferred embodiment of the invention, the sealing member 200 includes a thin member 202 with low gas permeability that is adhered to the edge of the front and rear elements. An adhesive 204 such as an epoxy adhesive, PSA or hot melt can be applied in a thin film to a thin member 202 with low gas permeability such as a metal foil or plastic film. Examples of materials that may be used as thin member 202 include polycarbonate (oxygen permeability of 90.6-124 $cm^3 \cdot mm/m^2 \cdot day \cdot atm$ and water permeability of 3.82-4.33 $gm \cdot mm/m^2 \cdot day$), polyvinylidene chloride (oxygen permeability of 0.0152-0.2533 $cm^3 \cdot mm/m^2 \cdot day \cdot atm$ and water permeability of 0.01-0.08 $gm \cdot mm/m^2 \cdot day$), and a multilayer film of plastic and/or metal. Such a film may include inorganic layers or a coating such as $SiO_2$, $Al_2O_3$, $Ta_2O_5$, Al, chrome, etc. that is bonded to the edges of the front and rear glass elements with an adhesive or glass frit. An example of a suitable multilayer film is the SARANEX brand PE/PVC-PVDC film, which has an oxygen permeability of 0.2-0.79 $cm^3 \cdot mm/m^2 \cdot day \cdot atm$ and water permeability of 0.06-0.16 $gm \cdot mm/m^2 \cdot day$.

Figure 25:
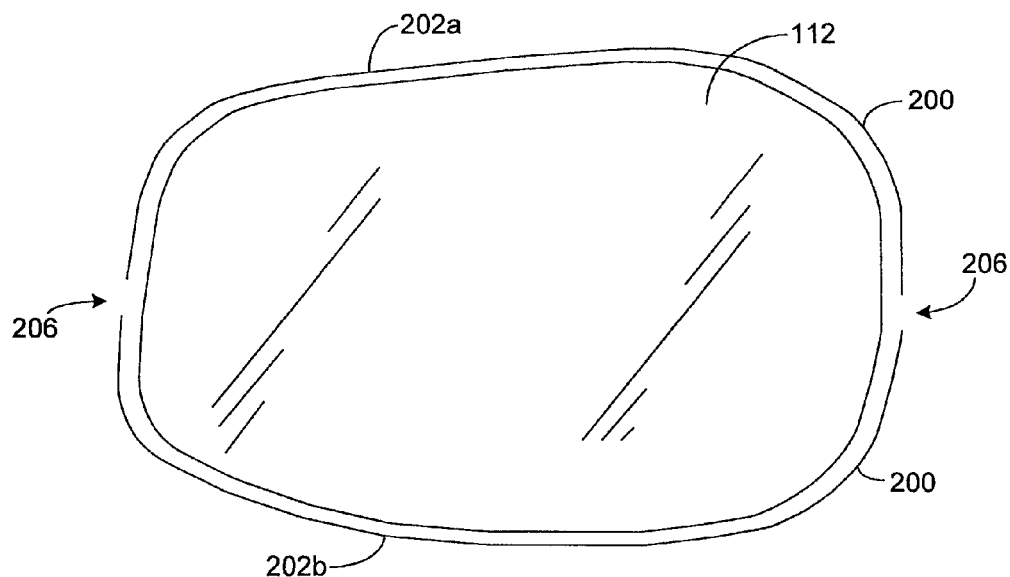
FIG. 25 is a top plan view of an electrochromic mirror element showing the provision of an edge seal as utilized in various embodiments of the present invention.

This foil or film 202 is then wrapped around the front and rear substrates that are held in the proper spaced apart relationship. The adhesive 204 bonds the foil or film 202 primarily to the substrate edges to form a gas and liquid tight seal around the perimeter of the electrochromic device. A fill port 206 (FIG. 25) could be added by leaving a gap in the foil or film edge sealing member or punching a hole through it. The fill hole could be soldered shut if a metal foil is used for the edge-sealing member. Alternatively, the fill hole could be plugged with an UV or visible light curing adhesive or hot melt or an additional thin sealing member such as a foil or film could be glued over the fill hole. If a light transparent film is used, a UV or visible light curing adhesive could be used to adhere the film. If a non-transparent metal foil is used a hot melt, PSA or other self-curing adhesive can be used. In this way the area that is required for a seal that is primarily between the substrates is eliminated and a bezel that had been designed to cover that area can be made narrower or eliminated.

Figure 26:
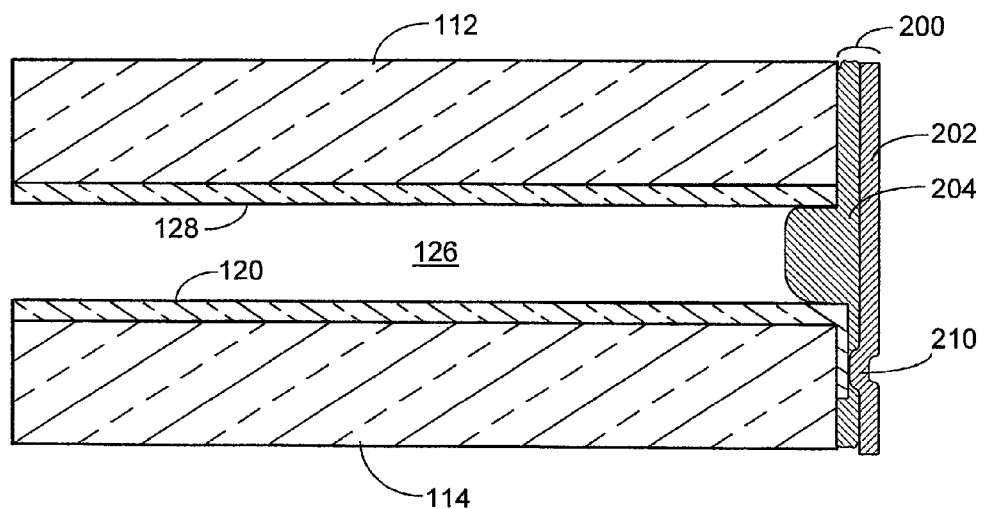
FIG. 26 is an enlarged cross-sectional view of an electrochromic mirror element incorporating an edge seal in accordance with a twenty second embodiment of the present invention.
Figure 27:
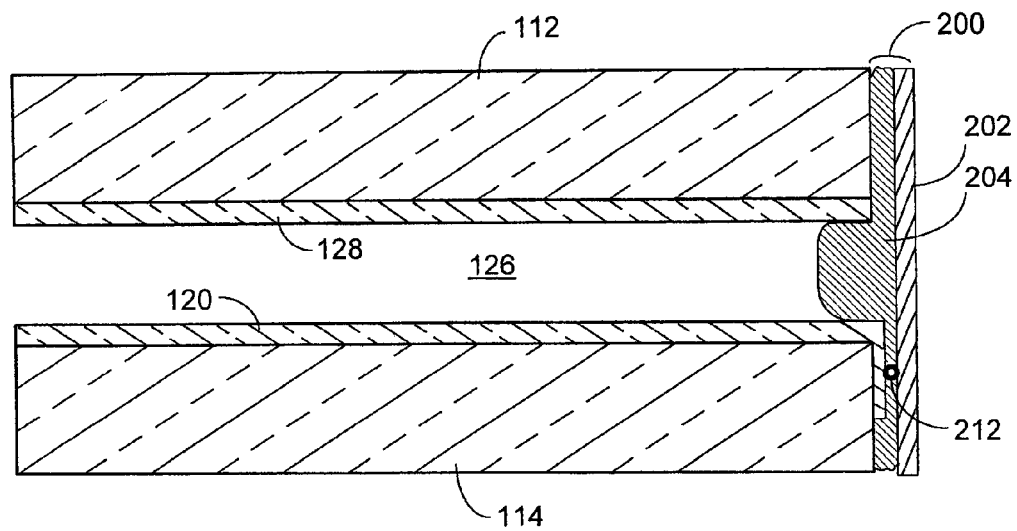
FIG. 27 is an enlarged cross-sectional view of an electrochromic mirror element incorporating an edge seal in accordance with a twenty third embodiment of the present invention.
Figure 28:
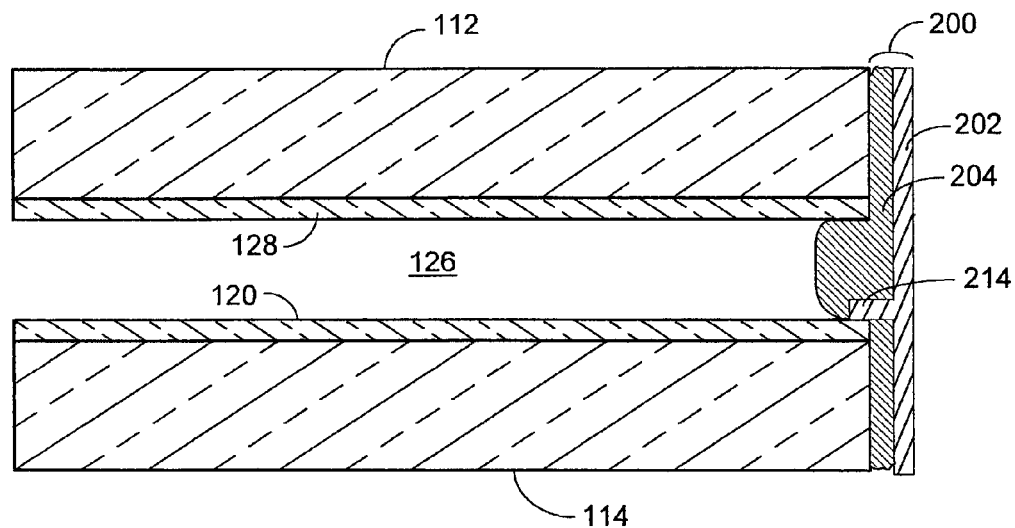
FIG. 28 is an enlarged cross-sectional view of an electrochromic mirror element incorporating an edge seal in accordance with a twenty fourth embodiment of the present invention.

If the low gas permeability member adhered to the side of the substrates has areas that are electrically conductive this member could also serve as an electrical buss to make contact to the conductive electrodes of the electrochromic device. Electrical isolation of the electrodes could be maintained by creating gaps in the electrical continuity of the edge seal member. For example, if a metal foil was used, small slits or gaps 206 (FIG. 25) could be created in the foil such as one to be used as a fill hole and another opposite the fill hole to electrically isolate top and bottom electrode busses. Electrical continuity between the conductive edge sealing member and the electrode could be established in any number of ways. The conductive electrode coating(s) 120 and/or 128 could wrap around the side of the substrate(s) (FIGS. 26 and 27) or an electrically conductive coating or adhesive 208 (FIGS. 29A-32) could be applied in areas that electrical connection to the edge bus is desired. The conductive sealing member 202 could have a dimple or crease 210 (FIG. 26) or include an inward protruding extension 214 (FIG. 28) to make contact through the adhesive bonding of the sealing member to the side of the substrate to make contact to the electrode coating or edge coating 120,128. Conductive particles in the adhesive or a conductive adhesive 208 could be used to make electrical contact between the conductive edge sealing member and the electrode coating or edge coating. A wire (212 in FIG. 27), metal clip (216 in FIG. 33) or other conductor could then be used to make contact between the electrically conductive edge seal 202 and the electrochromic device drive electronics. An electrochromic device made in this manor would require little or no bezel to cover the seal and contact area. A more detailed discussion of FIGS. 29A-33, is provided below.

Figure 29A:
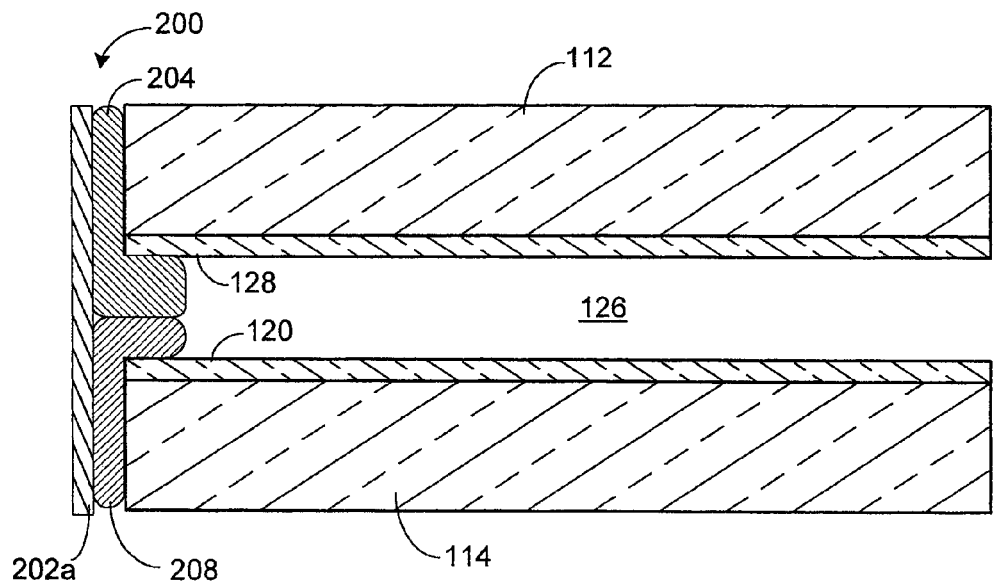
FIG. 29A is a first enlarged cross-sectional view of an electrochromic mirror element incorporating an edge seal in accordance with a twenty fifth embodiment of the present invention.
Figure 29B:
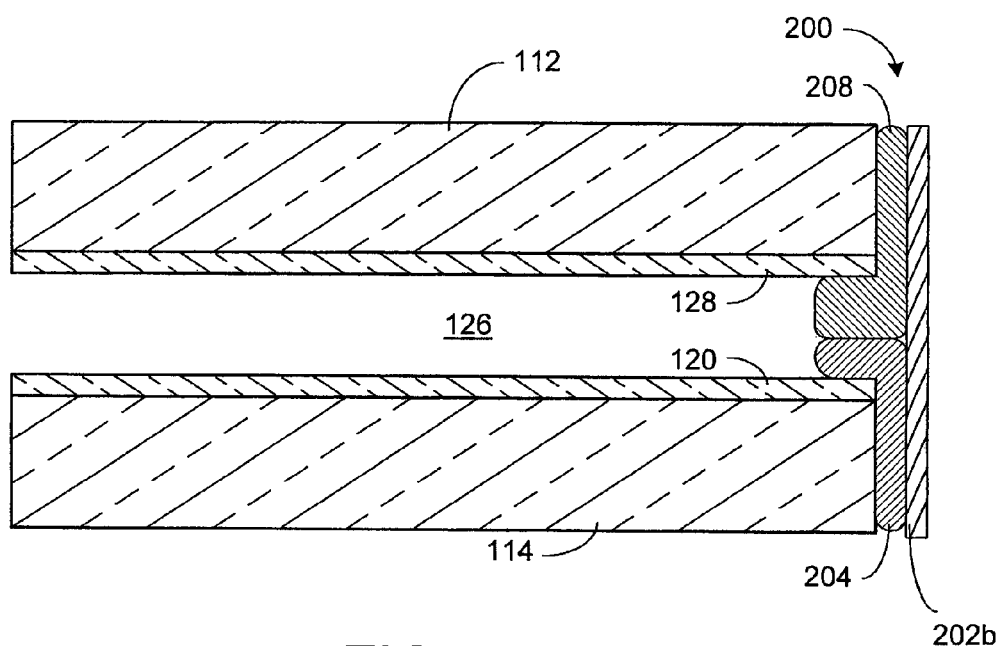
FIG. 29B is a second enlarged cross-sectional view of an electrochromic mirror element incorporating an edge seal in accordance with the twenty fifth embodiment of the present invention.

As shown in FIGS. 29A and 29B, thin seal member 202 may be secured to the peripheral edges of elements 112 and 114 using both an electrically conductive material 208 and a nonconductive material 204. As depicted in FIG. 29A, the conductive material 208 provides an electrical connection from conductive layer 128 to a first portion 202a (see FIG. 25) of seal member 202. As depicted in FIG. 29B, the conductive material 208 provides an electrical connection from conductive layer 120 to a second portion 202b of seal member 202. As mentioned above, fill ports, gaps or slits in the thin seal member and conductive material 208 may be used to electrically isolate portions 202a and 202b of thin seal member 202.

Figure 30:
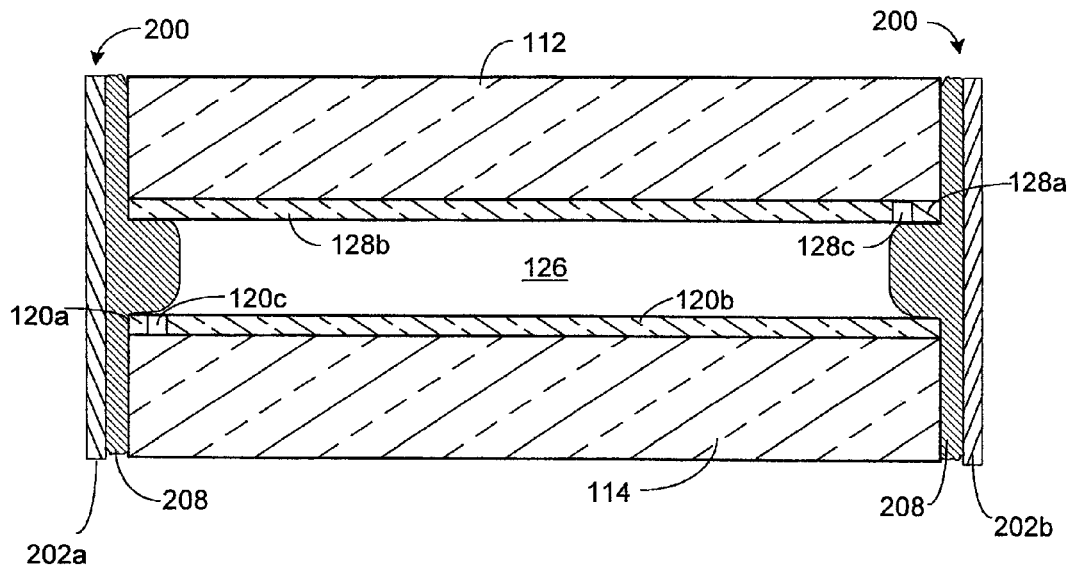
FIG. 30 is an enlarged cross-sectional view of an electrochromic mirror element incorporating an edge seal in accordance with a twenty sixth embodiment of the present invention.

In the embodiment shown in FIG. 30, conductive layers 128 and 120 are configured and oriented as shown in FIG. 8C, such that the conductive material 208 provides an electrical connection from conductive layer 128 to a first portion 202a (see FIG. 25) of seal member 202, and the conductive material 208 also provides an electrical connection from conductive layer 120 to a second portion 202b of seal member 202. As mentioned above, fill ports, gaps or slits in the thin seal member and conductive material 208 may be used to electrically isolate portions 202a and 202b of thin seal member 202.

Figure 31:
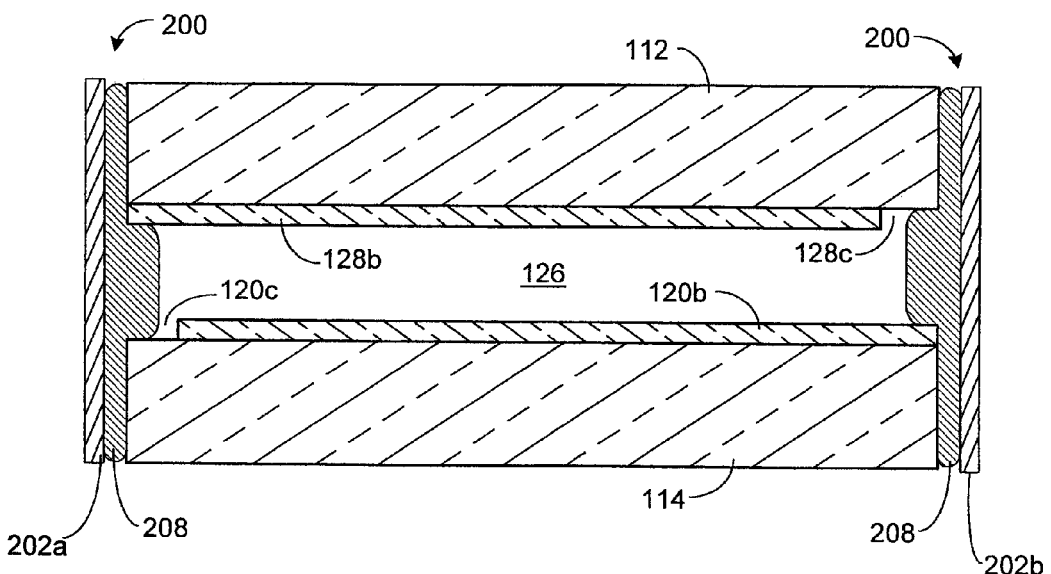
FIG. 31 is an enlarged cross-sectional view of an electrochromic mirror element incorporating an edge seal in accordance with a twenty seventh embodiment of the present invention.

FIG. 31 shows an embodiment similar to FIG. 30 with the exception that regions 128a and 120a of conductive layers 120 and 128 are eliminated.

Figure 32:
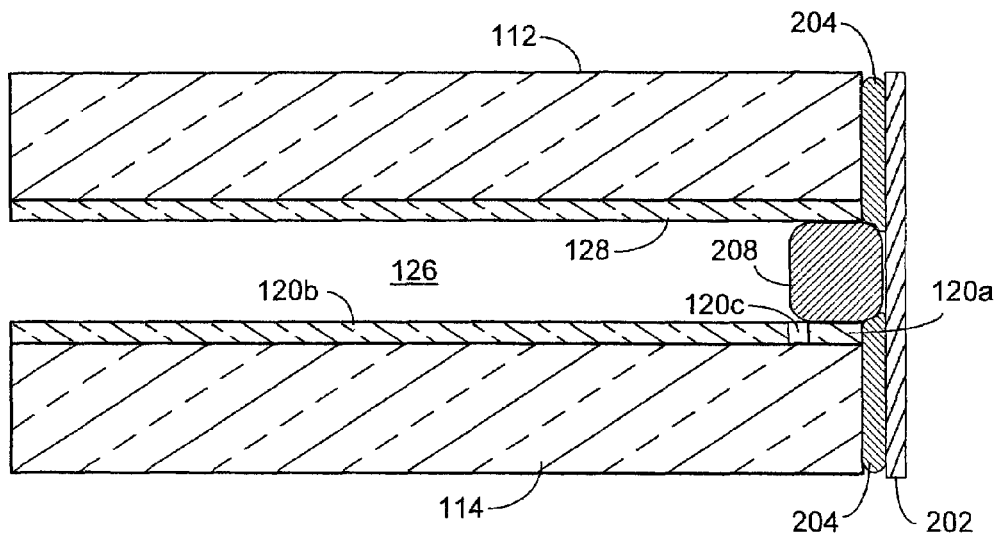
FIG. 32 is an enlarged cross-sectional view of an electrochromic mirror element incorporating an edge seal in accordance with a twenty eighth embodiment of the present invention.

FIG. 32 shows an embodiment wherein only the center portion of the adhesive material disposed between layers 120 and 128 is electrically conductive, while nonconductive material is used to adhere seal member 202 to the peripheral edges of elements 112 and 114. This provides the advantage that electrically conductive material 208 may not need to be as effective as an adhesive with respect to thin member 202.

Figure 33:
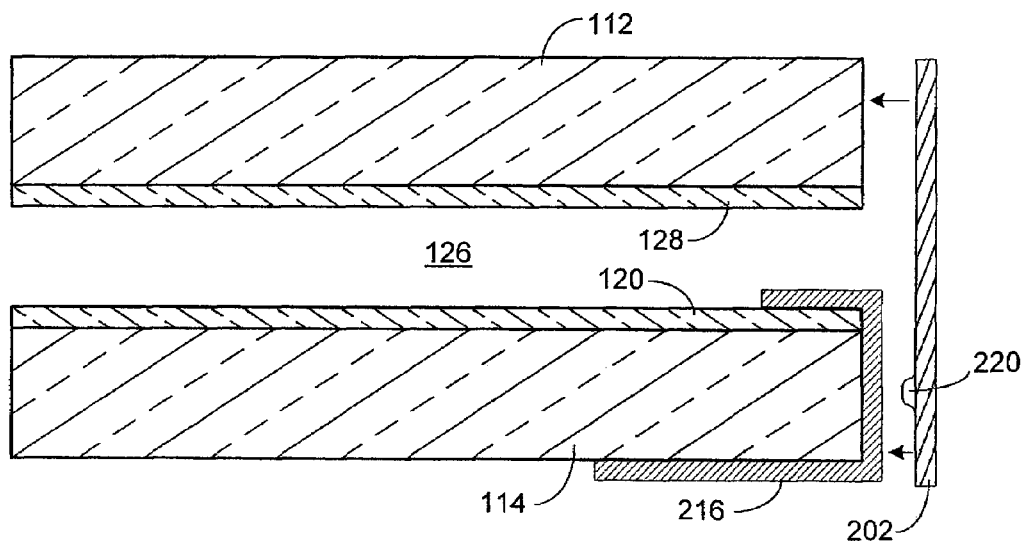
FIG. 33 is an enlarged cross-sectional view of an electrochromic mirror element incorporating an edge seal in accordance with a twenty-ninth embodiment of the present invention.

FIG. 33 shows an embodiment wherein a clip 216 (similar to clip 182 in FIGS. 21B and 21C) are used in combination with thin seal member 202, which may be a metal foil or the like. As illustrated, a solder bump 220 may be provided for soldering thin foil 202 to clip 216.

Methods for connecting electrodes of an electrochromic medium to a heater circuit or a flexible circuit board are disclosed in commonly assigned U.S. patent application Ser. No. 10/105,574 entitled "REARVIEW MIRROR ASSEMBLY CONSTRUCTION," filed on Mar. 25, 2002, now U.S. Pat. No. 6,657,767, the entire disclosure of which is incorporated herein by reference. Specifically, part of the flexible circuit board on which the heater circuit is provided may extend beyond the edges of element 114 and wrap upwardly so as to make contact with conductive material on the edge of the electrochromic device.

Another option for providing electrical contact would be to provide a conductive layer or other material on the inner surface of the bezel 144 in which pressure exerted by the bezel would create the contact force between the connector and either the electrode layers themselves or the conductive portion 152 of the seal.

As apparent from the foregoing embodiments, portions of the seal may be configured to function as an electrical buss. The seal may be electrically conductive either across a portion of its width, a portion of its height, or a portion of its length. A seal may be formed of a conductive ink or epoxy and may be filled with metal flakes, fibers, particles, or other conductive materials as described above.

It should be noted that the zero offset mirror with either the majority of the seal between the substrates or on the edge of the substrates presents a very sleek profile as compared to a typical electrochromic mirror with an offset and may require no substantial bezel at all. For example, with a black or tinted seal between the substrates an aesthetically pleasing mirror can be made by just rolling black or tinted paint over the edges of the mirror. The bezel would then consist of just a thin layer coating of paint or other material on the perimeter of the mirror that would look like a bezel. Likewise, this thin coating can be applied to wrap over the edge and cover a portion, or all, of the region between the substrate seal. This process would also apply to mirrors where the majority of the seal is on the edge of the glass. A thin coating of paint or other material could be applied to the edge of the mirror to present an edge that is aesthetically pleasing and uniform in appearance. Further, by providing a wider and more uniform seal, the need to obscure the seal may be eliminated.

As will be apparent to those skilled in the art, each of the above embodiments provides the advantage that the vertical positional offset between the front and rear elements 112 and 114 may be reduced or eliminated thereby reducing any corresponding portion of the width of the bezel (if provided). Other aspects of the invention can otherwise be used to obscure the view of the seal or provide unique bezels. It will be appreciated, however, that the various aspects may be used separately regardless of implementation of any of the other aspects, or may be used in various combinations.

Although the present invention has been generally described as being used in connection with electrochromic devices, such as mirrors and architectural windows, those skilled in the art will understand that various aspects of the present invention may be employed in the construction of other electro-optic devices.

While the invention has been described in detail herein in accordance with certain preferred embodiments thereof, many modifications and changes therein may be effected by those skilled in the art without departing from the spirit of the invention. Accordingly, it is our intent to be limited only by the scope of the appending claims and not by way of the details and instrumentalities describing the embodiments shown herein.

The invention claimed is:

1. An electrochromic device comprising:
   a front element having a peripheral edge, a front surface, and a rear surface having a first layer of electrically conductive material disposed thereon;
   a rear element having a peripheral edge, a front surface, and a rear surface, said front surface of said rear element having a second layer of electrically conductive material disposed thereon;
   an electrochromic material; and
   a seal provided to sealably bond said elements together to define a chamber in which said electrochromic material is disposed, wherein said seal is provided on the peripheral edges of both said front and rear elements and wherein said seal comprises a first material having an oxygen permeability of less than about 2.0 $cm^3 \cdot mm/m^2 \cdot day \cdot atm$.

2. The electrochromic device of claim 1, wherein said front and rear elements are substantially aligned with less than 0.5 mm offset in any lateral direction.

3. The electrochromic device of claim 1 and further comprising an electrically conductive wire provided between said first and second conductive layers and in electrical contact with at least one of said conductive layers.

4. The electrochromic device of claim 1, wherein a peripheral area of said front surface of said front element is configured to obscure the view of said seal.

5. The electrochromic device of claim 1, wherein said seal comprises a thin member made of said first material and bonded to the peripheral edge of at least one of said front and rear elements.

6. The electrochromic device of claim 5, wherein said thin member comprises one of a film, thin glass, and a strip of foil.

7. The electrochromic device of claim 5, wherein said thin member is electrically conductive and functions as an electrical buss to pass electrical current through said first and second layers of electrically conductive material.

8. The electrochromic device of claim 5, wherein said thin member is bonded to the peripheral edge by an electrically conductive adhesive.

9. The electrochromic device of claim 5, wherein said thin member is bonded to the peripheral edge of both of said front and rear elements.

10. The electrochromic device of claim 1, wherein said seal is adhered to the peripheral edges of said front and rear elements with a second material.

11. The electrochromic device of claim 10, wherein said second material has a higher oxygen permeability than said first material.

12. The electrochromic device of claim 11, wherein said first material of said seal is selected from the group of: metal, metal alloy, plastic, glass, and combinations thereof.

13. The electrochromic device of claim 1, wherein said seal comprises metal, metal alloy, plastic, glass, and combinations thereof.

14. The electrochromic device of claim 1, wherein said seal comprises an electrically conductive adhesive.

15. The electrochromic device of claim 1, wherein said seal comprises an electrically conductive epoxy.

16. The electrochromic device of claim 1, wherein said seal comprises an electrically conductive material that makes electrical contact with at least one of said first and second layers.

17. The electrochromic device of claim 1, wherein said seal contacts said front element both on the peripheral edge and the rear surface of said front element, wherein a first contact area in which said seal contacts the peripheral edge of said front element is larger than a second contact area in which said seal contacts the rear surface of said front element.

18. The electrochromic device of claim 1, wherein said seal contacts said rear element both on the peripheral edge and the front surface of said rear element, wherein a first contact area in which said seal contacts the peripheral edge of said rear element is larger than a second contact area in which said seal contacts the front surface of said rear element.

19. The electrochromic device of claim 1, wherein an interface between said seal and said front element provides an oxygen penetration path length through which oxygen would have to travel to enter said chamber, wherein the portion of the path length extending along the peripheral edge of said front element is longer than the portion of the path length extending along the rear surface of said front element.

20. The electrochromic device of claim 1, wherein an interface between said seal and said rear element provides an oxygen penetration path length through which oxygen would have to travel to enter said chamber, wherein the portion of the path length extending along the peripheral edge of said rear element is longer than the portion of the path length extending along the front surface of said rear element.

21. The electrochromic device of claim 1, wherein said first material is selected from the group of: metal, metal alloy, plastic, glass, and combinations thereof.

22. An electrochromic device comprising:
a front element having a peripheral edge, a front surface, and a rear surface having a first layer of electrically conductive material disposed thereon;
a rear element having a peripheral edge, a front surface, and a rear surface, said front surface of said rear element having a second layer of electrically conductive material disposed thereon;
an electrochromic material; and
a seal provided on both said front and rear elements to sealably bond said elements together to define a chamber in which said electrochromic material is disposed, wherein said seal comprises a thin member bonded to the peripheral edge of at least one of said front and rear elements, wherein said thin member comprises one of a film, thin glass, and a strip of foil.

23. The electrochromic device of claim 22, wherein said front and rear elements are substantially aligned with less than 0.5 mm offset in any lateral direction.

24. The electrochromic device of claim 22 and further comprising an electrically conductive wire provided between said first and second conductive layers and in electrical contact with at least one of said conductive layers.

25. The electrochromic device of claim 22, wherein a peripheral area of said front surface of said front element is configured to obscure the view of said seal.

26. The electrochromic device of claim 22, wherein said thin member is electrically conductive and functions as an electrical buss to pass electrical current through said first and second layers of electrically conductive material.

27. The electrochromic device of claim 22, wherein said thin member is bonded to the peripheral edge by an electrically conductive adhesive.

28. The electrochromic device of claim 22, wherein said thin member is bonded to the peripheral edge of both of said front and rear elements.

29. The electrochromic device of claim 22, wherein said thin member is made of a first material and is adhered to the peripheral edges of said front and rear elements with a second material.

30. The electrochromic device of claim 29, wherein said second material has a higher oxygen permeability than said first material.

31. The electrochromic device of claim 29, wherein said first material of said seal is selected from the group of: metal, metal alloy, glass, and combinations thereof.

32. The electrochromic device of claim 29, wherein said second material is an electrically conductive adhesive.

33. The electrochromic device of claim 22, wherein said seal further comprises an electrically conductive epoxy.

34. The electrochromic device of claim 33, wherein said electrically conductive epoxy contacts said front element both on the peripheral edge and the rear surface of said front element, wherein a first contact area in which said electrically conductive epoxy contacts the peripheral edge of said front element is larger than a second contact area in which said electrically conductive epoxy contacts the rear surface of said front element.

35. The electrochromic device of claim 33, wherein said electrically conductive epoxy contacts said rear element both on the peripheral edge and the front surface of said rear element, wherein a first contact area in which said electrically conductive epoxy contacts the peripheral edge of said rear element is larger than a second contact area in which said electrically conductive epoxy contacts the front surface of said rear element.

36. The electrochromic device of claim 22, wherein an interface between said electrically conductive epoxy and said front element provides an oxygen penetration path length through which oxygen would have to travel to enter said chamber, wherein the portion of the path length extending along the peripheral edge of said front element is longer than the portion of the path length extending along the rear surface of said front element.

37. The electrochromic device of claim 22, wherein an interface between said seal and said rear element provides an oxygen penetration path length through which oxygen would have to travel to enter said chamber, wherein the portion of the path length extending along the peripheral edge of said rear element is longer than the portion of the path length extending along the front surface of said rear element.

* * * * *